United States Patent [19]
Tanaka et al.

[11] Patent Number: 6,154,875
[45] Date of Patent: Nov. 28, 2000

[54] GRAPHICAL PROGRAMMING SYSTEM THAT ALLOWS EASY HANDLING OF DATA STRUCTURES AND CREATION OF PROGRAMS BY MANIPULATING GRAPHIC COMPONENTS

[75] Inventors: Yuzuru Tanaka, Sapporo; Satoshi Kikuchi; Takamoto Imataki, both of Kawasaki; Koichi Sakamoto; Munechika Nishida, both of Yokohama, all of Japan

[73] Assignees: Fujitsu Limited, Kawasaki; Hitachi Software Engineering Co., Ltd., Yokohama, both of Japan

[21] Appl. No.: 08/982,706

[22] Filed: Dec. 2, 1997

Related U.S. Application Data

[63] Continuation of application No. 08/314,305, Sep. 30, 1994, abandoned.

[30] Foreign Application Priority Data

Dec. 28, 1993 [JP] Japan .................................. 5-338166

[51] Int. Cl.[7] ...................................................... G06F 9/45
[52] U.S. Cl. ............................................................. 717/2
[58] Field of Search ........................... 379/211; 345/346, 345/331; 395/670, 500, 702; 365/52; 717/2, 1

[56] References Cited

U.S. PATENT DOCUMENTS

| | | | |
|---|---|---|---|
| 4,656,605 | 4/1987 | Dunn .......................................... | 365/52 |
| 4,860,204 | 8/1989 | Gendron et al. ........................... | 364/300 |
| 4,928,247 | 5/1990 | Doyle et al. ............................... | 395/356 |
| 5,107,443 | 4/1992 | Smith et al. ................................ | 345/331 |
| 5,155,822 | 10/1992 | Doyle et al. ............................... | 711/202 |
| 5,301,301 | 4/1994 | Kodosky et al. .......................... | 395/500 |
| 5,392,207 | 2/1995 | Wilson et al. ....................... | 364/167.01 |
| 5,410,702 | 4/1995 | Abraham et al. ......................... | 395/670 |
| 5,416,900 | 5/1995 | Blanchard et al. ....................... | 345/346 |
| 5,485,615 | 1/1996 | Wynnmer ................................. | 395/700 |
| 5,487,111 | 1/1996 | Cain et al. ................................ | 379/211 |
| 5,491,780 | 2/1996 | Fyles et al. .............................. | 395/153 |
| 5,553,224 | 9/1996 | Saund et al. ............................. | 345/433 |
| 5,754,808 | 5/1998 | Tanaka et al. ........................... | 345/339 |
| 5,850,548 | 12/1998 | Williams .................................... | 717/1 |
| 5,872,973 | 2/1999 | Mitchell et al. .......................... | 709/305 |
| 5,907,704 | 5/1999 | Gudmundson et al. .................... | 717/1 |
| 5,978,582 | 11/1999 | McDonald et al. ......................... | 717/2 |

OTHER PUBLICATIONS

"Borland Paradox For Windows: Guide to ObjectPAL". Borland International, 1996, pp. 1, 138–143.

Title: Template Based Mapping of Application Data to Interactive Display, Author: Pedro Szekely, Source: ACM, 1990.

Title: Contracts: Specifying Behavioral Compositions in Object–Oriented System, Author: Helm et al, source, ACM, 1990.

Title: Applying Algorithm Animation Techniques for Program tracing, Debugging, and Understanding, Author: Mukherjee, source: IEEE, 1993.

*Primary Examiner*—Tariq R. Hafiz
*Assistant Examiner*—Chameli Chaudhuridas
*Attorney, Agent, or Firm*—Staas & Halsey, LLP

[57] ABSTRACT

A graphical programming system (1) allows a user to visually create a program. The system employs and input unit (12) and a display (11). The system includes, for example, a graphic-component memory (3) storing graphic components each corresponding to a program that achieves a task such as an operation task or a database task, and displaying the graphic components on the display (11), a task memory (5) storing the programs corresponding to the graphic components and providing the graphic-component memory (3) with data obtained by executing the programs, and a graphic component generator (6) automatically generating data on the graphic components and storing the data in the graphic-component memory (3).

11 Claims, 21 Drawing Sheets

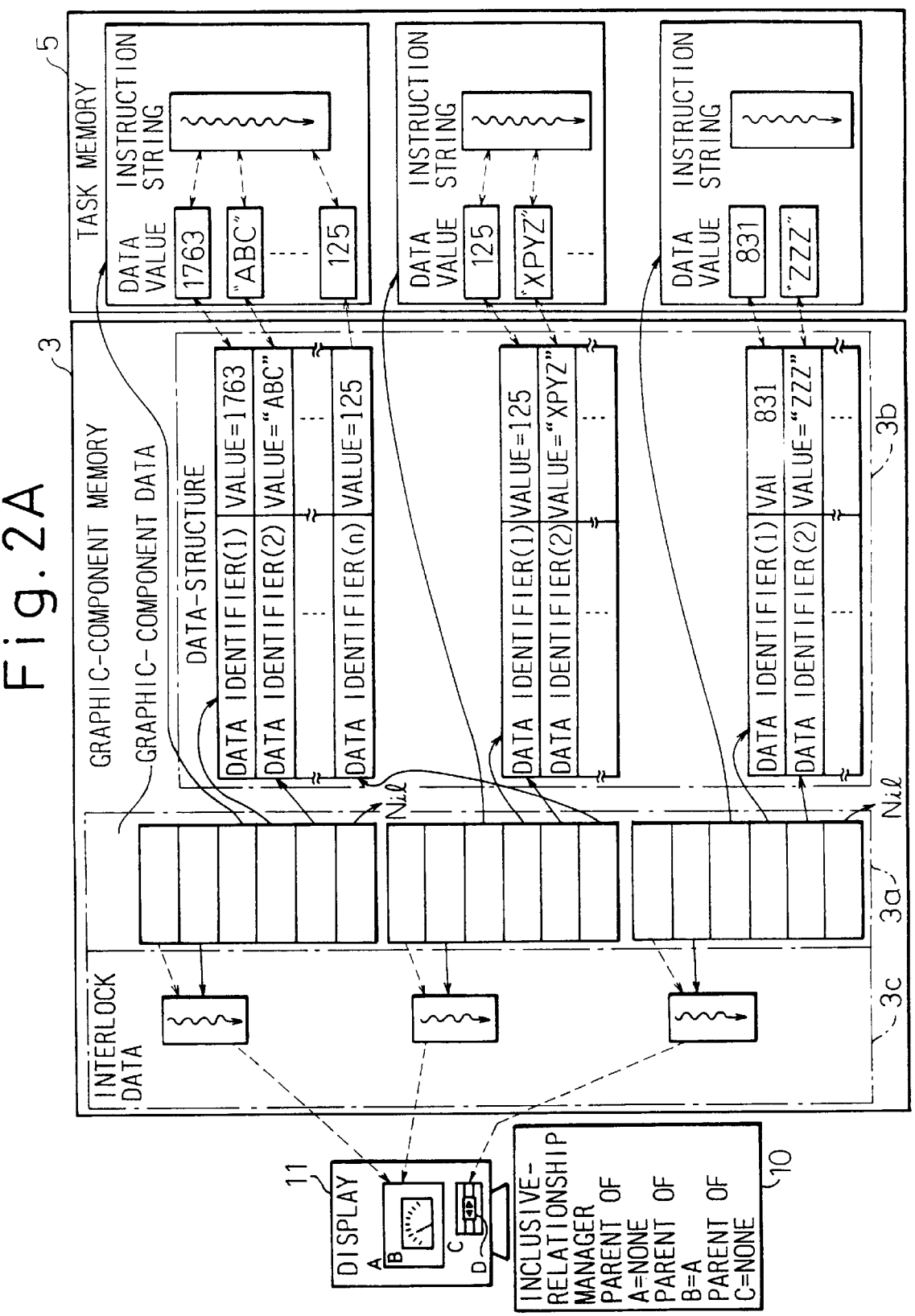

GRAPHICAL PROGRAMMING SYSTEM THAT ALLOWS EASY HANDLING OF DATA STRUCTURES AND CREATION OF PROGRAMS BY MANIPULATING GRAPHIC COMPONENTS

This application is a continuation of application Ser. No. 08/314,305, filed Sep. 30, 1994, now abandoned.

BACKGROUND OF THE INVENTION

1. Field of the Invention

The present invention relates to a programming system, and particularly, to a graphical programming system that displays graphic components each corresponding to a program that carries out a task such as an operation task or a database task. A user directly controls the graphic components with, for example, a mouse, to make a program.

This programming system enables a user to freely combine the graphic components and easily create or edit application programs.

This programming system enables a plurality of computers to share, through a network, events caused by users or changes occurring in displayed images. Namely, the system allows the users of the computers to cooperate with one another through the network. This system is applicable to education and game fields.

2. Description of the Related Art

A conventional programming technique must have a plurality of libraries each containing a plurality of programs. Each of the programs carries out a task such as an operation task or a database task. A programmer employs an editor and a programming language to write a source file to call the libraries and determine an execution order of the libraries and a method of handling data. The source file is compiled into a relocatable object file having undefined addresses. The object file is linked by a linker to libraries required for arithmetic operations, database processes, and graphic processes, to form a computer-executable program written in a machine language having defined addresses. The executable program is loaded into a computer. Alternatively, instructions in the source program are successively interpreted for a computer by an interpreter.

A GUI (graphical user interface) is useful to create programs. This technique, however, requires a programmer to write programs. For example, a programmer draws a button on a display and writes an application program to be executed upon the operation of the button. To write programs, the programmer must use libraries. The libraries have different function interfaces. Namely, the libraries have different data-call formats, data types, and description formats, so that no one can prepare a program without the knowledge of the libraries.

Programming languages used for a conventional programming system are difficult to grasp in terms of links among data. Accordingly, the conventional programming system only allows programmers to write programs and keeps end users away from programming computers.

There is a programming method that employs icons each representing a function. A user connects the icons with lines, to make a program. The program thus made is, however, usually not reusable. Namely, there is a problem that the program cannot be utilized as an intellectual asset.

Programmers must classify data into numeric data and character data for a conventional programming system. This may cause errors when preparing a program that handles a complicated data structure because such a complicated data structure is very difficult to read.

When a plurality of computers are connected to cooperate together, the conventional system requires the computers to be adjusted whenever the operational configuration is changed.

In a program prepared by the conventional programming system, it is difficult to distinguish tasks in the program from one another. If a subsidiary task takes place in a main task, the subsidiary task must be written in a separate block in the program, or it must be clarified by indents. To graphically display the relationship between the subsidiary and main tasks, another program must be created, compiled, and interpreted.

SUMMARY OF THE INVENTION

An object of the present invention is to provide a programming system that allows not only programmers but also general users to easily create programs.

Another object of the present invention is to provide a programming system capable of creating visual programs that are reusable through duplication, deletion, synthesis, and decomposition.

Still another object of the present invention is to provide a programming system that allows users to visually create programs having complicated but easy-to-read data structures, without errors.

Still another object of the present invention is to provide a programming system capable of carrying out different cooperative operations in a network of computers without changing the configurations of the computers.

Still another object of the present invention is to provide a programming system employing graphic components each corresponding to a specific task. The graphic components are visually combined together to form a new program that achieves a combination of the corresponding tasks. The program thus formed is easy to read and requires no compilation or interpretation.

In order to accomplish the above objects, the present invention provides a graphical programming system having:

a unit relating a graphic component to a program;

an inclusive-relationship specifier establishing inclusive relationships (parent-child relationships) among graphic components so that one of the graphic components transmits data to another; and a unit generating a program for a new graphic component including of at least two graphic components that are inclusively related to each other.

FIG. 1 shows the principle of the present invention. An input unit 12 is, for example, a keyboard or a mouse. A user enters data through the input unit 12 into a graphical programming system 1, which displays data on a display 11 such as a CRT. The system 1 has:

a graphic-component memory 3 storing graphic components each corresponding to a program executing a task such as an operation task or a database task, and displaying the graphic components on the display 11;

a task memory 5 storing the programs corresponding to the graphic components and providing the graphic-component memory 3 with results of execution of the programs; and a graphic-component generator 6 automatically generating data for visualizing the graphic components and storing the generated data in the graphic-component memory 3.

According to the present invention, a graphical programming system for letting a user enter instructions through an input unit 12 to manipulate graphic components displayed on a display 11, to create a new graphic component and a corresponding new program, has:

a graphic-component memory 3 storing data on graphic components each corresponding to a program executing a task such as an operation task or a database task, and displaying the graphic components on the display 11;

a task memory 5 storing the programs corresponding to the graphic components and providing the graphic-component memory 3 with results of execution of the programs;

an inclusive-relationship specifier 2 establishing an inclusive relationship among graphic components displayed on the display 11 according to instructions entered through the input unit 12;

an inclusive-relationship manager 10 storing the established inclusive relationship; and a data link unit 8 transferring data among the graphic components according to the relationships stored in the inclusive-relationship manager 10.

The system 1 may have a representative-value changer 7 selecting, as a representative value of a given graphic component, a value corresponding to a most-frequently-used port among ports that are contained in a data structure 3b of the given graphic component and are used for data transmission with another graphic component.

The data structure 3b is in the graphic-component memory 3, to temporarily store data to be transmitted to another graphic component through the ports, and store data from the task memory 5.

The system 1 may have a process structure converter 4b determining the process structure of a program corresponding to a new graphic component created by inclusively relating original graphic components.

The system 1 may have a data structure converter 4a determining the data structure (numeric or character) of a given graphic component.

The data link unit 8 may have an interface transferring any kind of data among graphic components.

A plurality of the systems 1 may cooperate with one another. In this case, each of the systems 1 is provided with an event manager 9, which forms a shared area on the display 11 so that an event occurring in the shared area due to an operation through the input unit 12 or due to a change in displayed images is shared by the systems 1.

The graphical programming system according to the present invention uses graphic components as representatives of libraries of functions. A user visually handles these graphic components with an input unit, to create a new graphic component, i.e., a new program.

The graphical programming system according to the present invention forms a shared area on the display of each of computers, so that the computers cooperate with one another through the shared area. Each computer can independently execute its own task in the remaining area excluding the shared area on the display.

BRIEF DESCRIPTION OF THE DRAWINGS

Other objects and features of the present invention will be described hereinafter in detail by way of preferred embodiments with reference to the accompanying drawings, in which:

FIG. 2A shows the details of a graphic-component memory and a task memory according to the present invention;

FIG. 2B shows the details of graphic-component data 3a;

DESCRIPTION OF THE PREFERRED EMBODIMENTS

Figure 1:
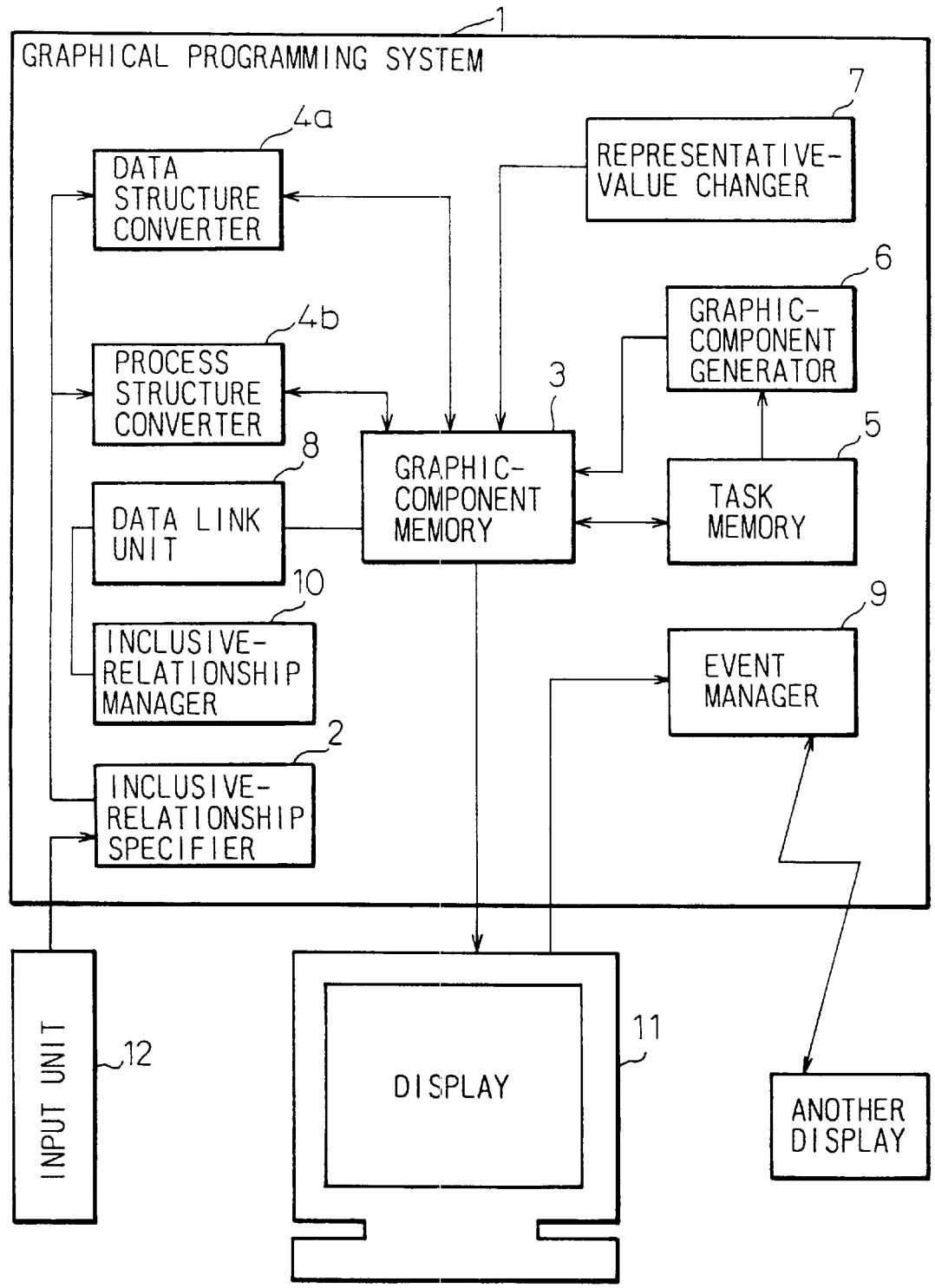
FIG. 1 shows the principle of the present invention.

FIG. 1 shows the principle of a graphical programming system 1 according to the present invention. A user manipulates an input unit 12 such as a keyboard or a mouse, to enter instructions into the system 1. The system 1 has a CPU and memories to display data on a display 11, such as a CRT, according to the instructions. The system 1 has an inclusive-relationship specifier 2, a graphic-component memory 3, a data-structure converter 4a, a process-structure converter 4b, a task memory 5, a graphic-component generator 6, a representative-value changer 7, a data-link unit 8, an event manager 9, and an inclusive-relationship manager 10.

The inclusive-relationship specifier 2 receives user's instructions through the input unit 12, moves a child graphic component onto a parent graphic component on the display 11 according to the instructions, and inclusively relates the parent and child graphic components to each other. The output of the parent component is passed to the child component. The inclusive-relationship specifier 2 edits the inclusive relationship between graphic components by copying, deleting, combining, or decomposing the graphic components. The inclusive relationship is synonymous with the parent-child relationship between graphic components one of which serves as a parent and is arranged under the other that serves as a child component on the display 11.

FIG. 2A shows the details of the graphic-component memory 3 and task memory 5. The display 11 in FIG. 2A shows a graphic component A, i.e., a base sheet, a graphic component B, i.e., a meter disposed on the graphic component A, and a graphic component C, i.e., a slider having a graphic component D, i.e., a cursor. The cursor D and an indicator of the meter B move in response to each other. The inclusive-relationship manager 10 shows that the graphic component A is the parent of the graphic component B.

Figure 2B:
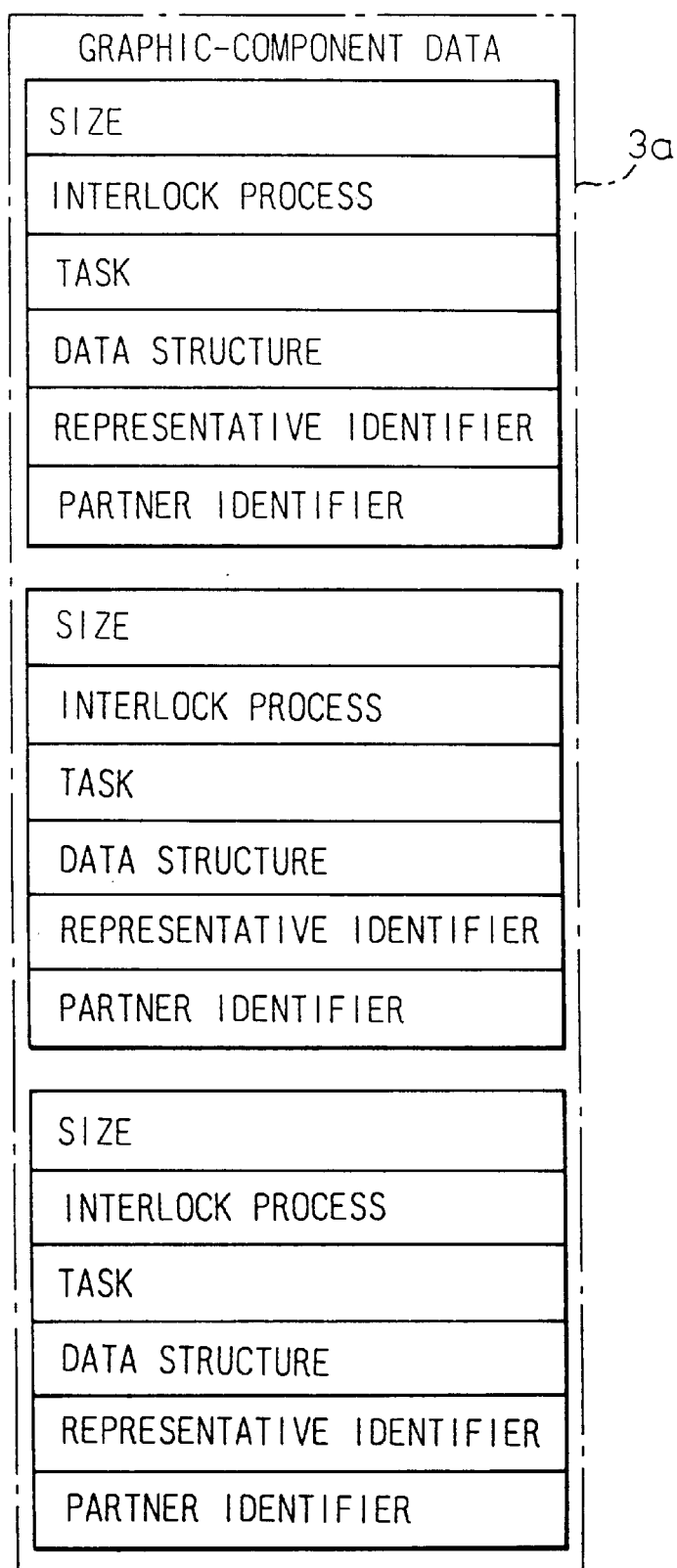

The graphic-component memory 3 stores, for each graphic component, graphic-component data 3a which is shown in detail in FIG. 2B, data-structure data 3b, and interlock data 3c. The graphic-component data 3a include the size, link process, task, data structure, representative-value identifier, and partner identifier of each graphic component. The data-structure data 3b include, for each graphic component, data identifiers for slots, i.e., I/O ports with respect to another graphic component, and data values corresponding to the data identifiers. The interlock data 3c include, for each graphic component, data for displaying the graphic component on the display 11.

A method of creating a graphic component corresponding to a program for executing a task such as an operation task or an RDB (relational database) task will now be explained. A component-definition file is automatically prepared from a slot-definition file that combines numeric and character data and a program file for the task. A language processor forms an object file according to the component-definition file. A linker links graphic processing libraries and operation libraries or RDB process libraries to be required, to form a dynamic rib library in an executable format. The dynamic rib library is loaded into the system 1, which displays the graphic component on the display 11. Instructions to generate such a graphic component are called component-generation instructions. The created graphic component is visually manipulated on the display 11 by a user.

The data-structure converter 4a receives data from the inclusive-relationship specifier 2 and graphic-component memory 3, determines the data structure of a new graphic component according to the data structure of original graphic components, and provides the graphic-component memory 3 with the determined data structure for the new graphic component.

The process structure converter 4b receives data from the inclusive-relationship specifier 2 and graphic-component memory 3, determines the process structure of the new graphic component according to the process structures of the original graphic components, and provides the graphic-component memory 3 with the determined process structure for the new graphic component.

The task memory 5 stores programs each including a string of instructions to describe the task of the corresponding graphic component. The task memory 5 provides the graphic-component memory 3 with results of execution of a program corresponding to a given graphic component, to update values of data identifiers of the given graphic component in the data-structure data 3b.

The graphic-component generator 6 automatically generates the graphic-component data 3a, data-structure data 3b, and interlock data 3c in the graphic-component memory 3, to visualize corresponding graphic components. Instead of generating these data by the graphic-component generator 6, they may be entered by a user into the graphic-component memory 3.

The representative-value changer 7 determines, for a given graphic component, a representative value according to a representative-value identifier contained in the graphic-component data 3a of the given graphic component. The representative-value identifier specifies one of the data identifiers contained in the data-structure data 3b, and the specified data identifier indicates the representative-value that is passed through a main slot of the given graphic component. The representative value is changed when the graphic-component data 3a are updated. The representative-value changer 7 selects, as a representative value of a given graphic component, a value corresponding to a most-frequently-used port among ports that are contained in a data structure of the given graphic component and are used for data transmission with another graphic component.

The data link unit 8 transfers data between parent and child graphic components according to a parent-child relationship stored in the inclusive-relationship manager 10. The parent and child graphic components have standardized interfaces, so that the data link unit 8 can transfer data between any parent-child combination of graphic components.

The event manager 9 copies shared graphic components from a master display 11 to slave displays (not shown). Accordingly, an event caused by a mouse operation or by a change in an image on any one of the displays is shared by all displays through a server-and-client communication system.

The inclusive-relationship manager 10 stores parent-child relationships among graphic components displayed on the display 11, and the data link unit 8 transfers data between parent and child graphic components through their main slots.

Figure 3:
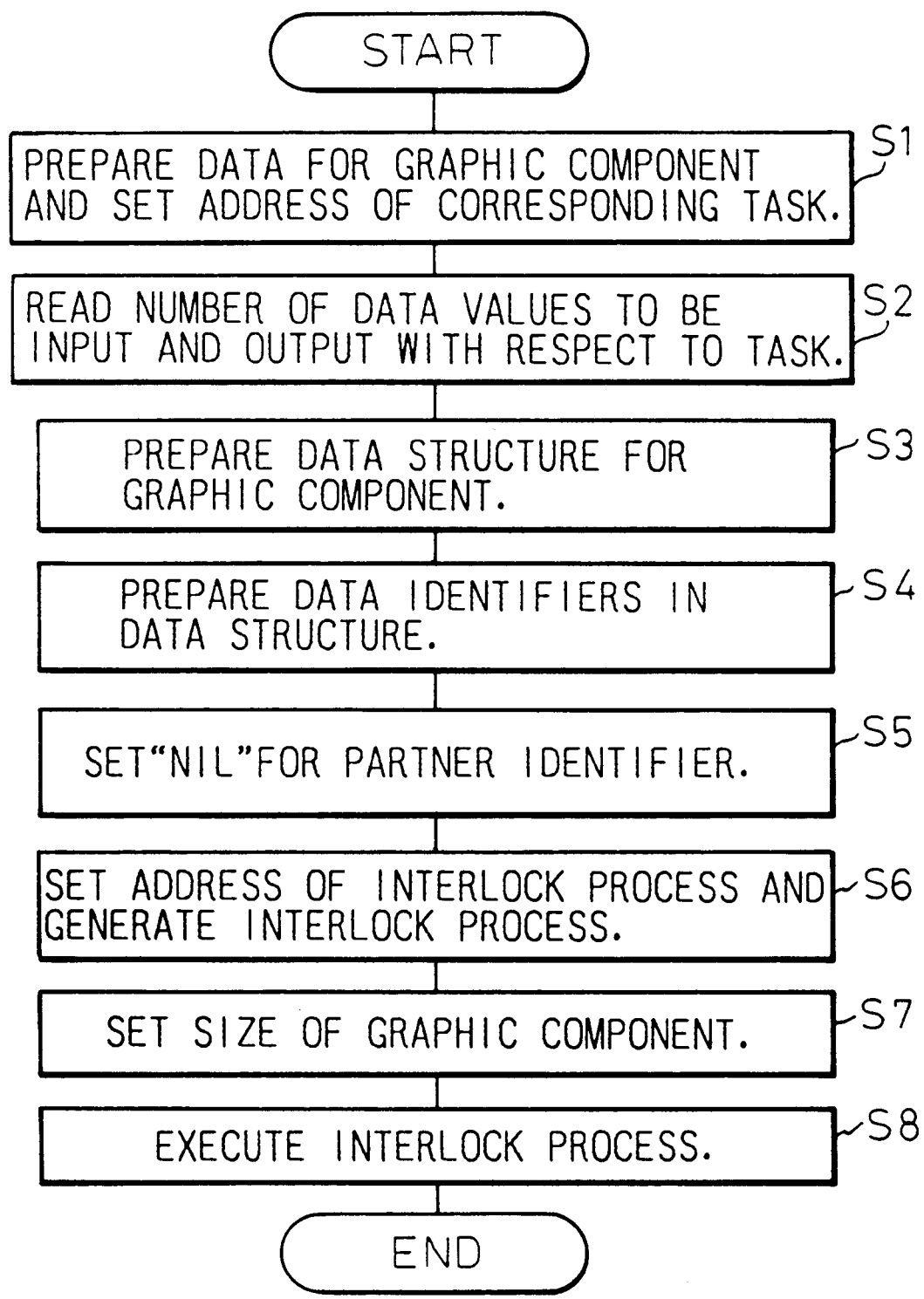
FIG. 3 is a flowchart showing steps taken by a graphic-component generator.

FIG. 3 is a flowchart showing steps taken by the graphic-component generator 6. Step S1 generates data 3a for each graphic component and sets the address of a corresponding task. Step S2 reads the number of values to be input and output with respect to the task out of a generator definition statement. Step S3 prepares data-structure data 3b for the graphic-component data 3a. Step S4 sequentially writes data identifiers contained in the data-structure data 3b. Step S5 sets "nil" in a partner identifier. Step S6 sets the address of an interlock process and generates the interlock process, which is a program for drawing the graphic component. Step S7 sets the size of an area for the graphic component to a reference value or a specified value. Step S8 carries out the interlock process to draw the graphic component on the display 11. The flow then ends.

Figure 4:
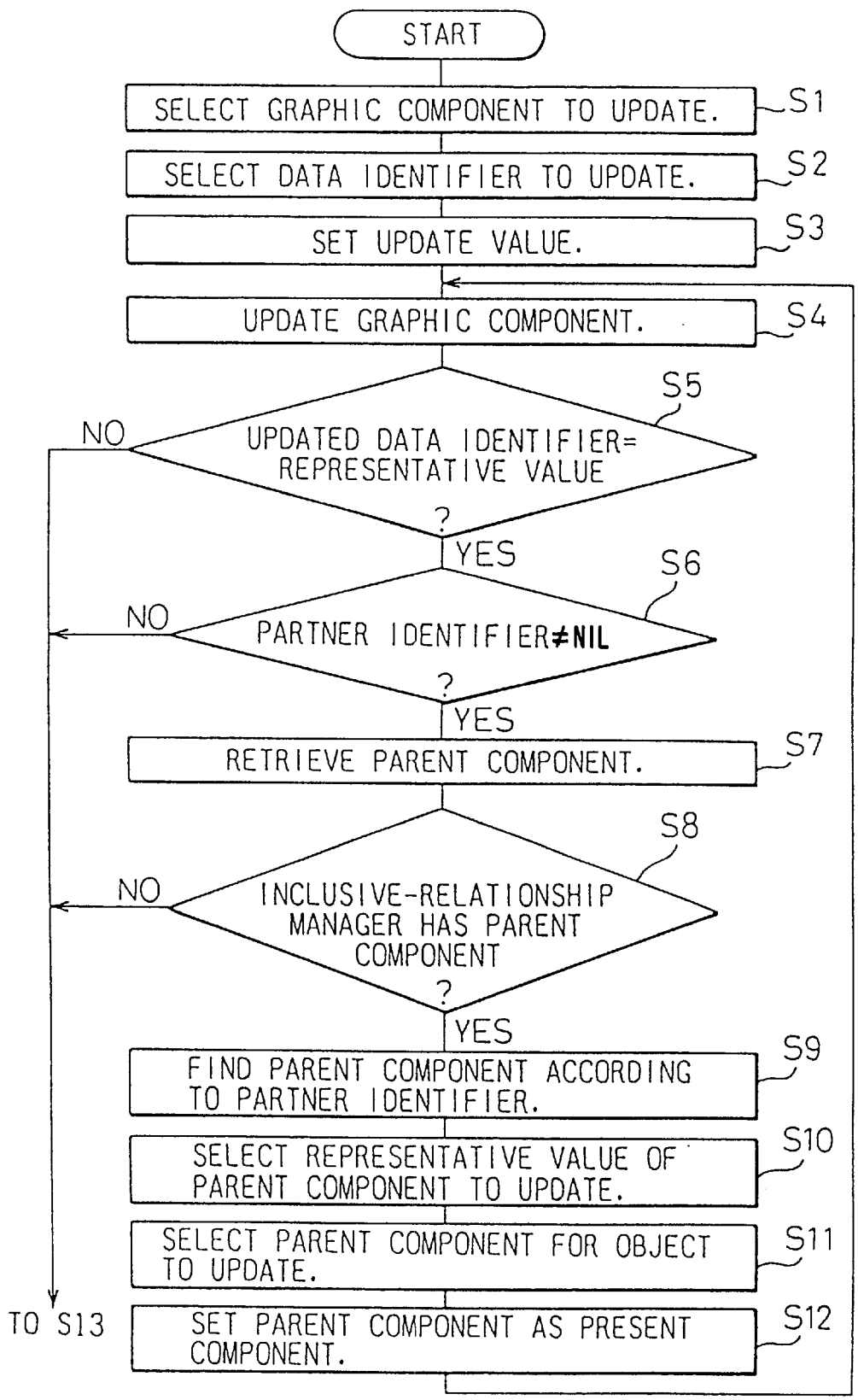
FIG. 4 is a flowchart showing the first half of steps taken by a data link unit.
Figure 5:
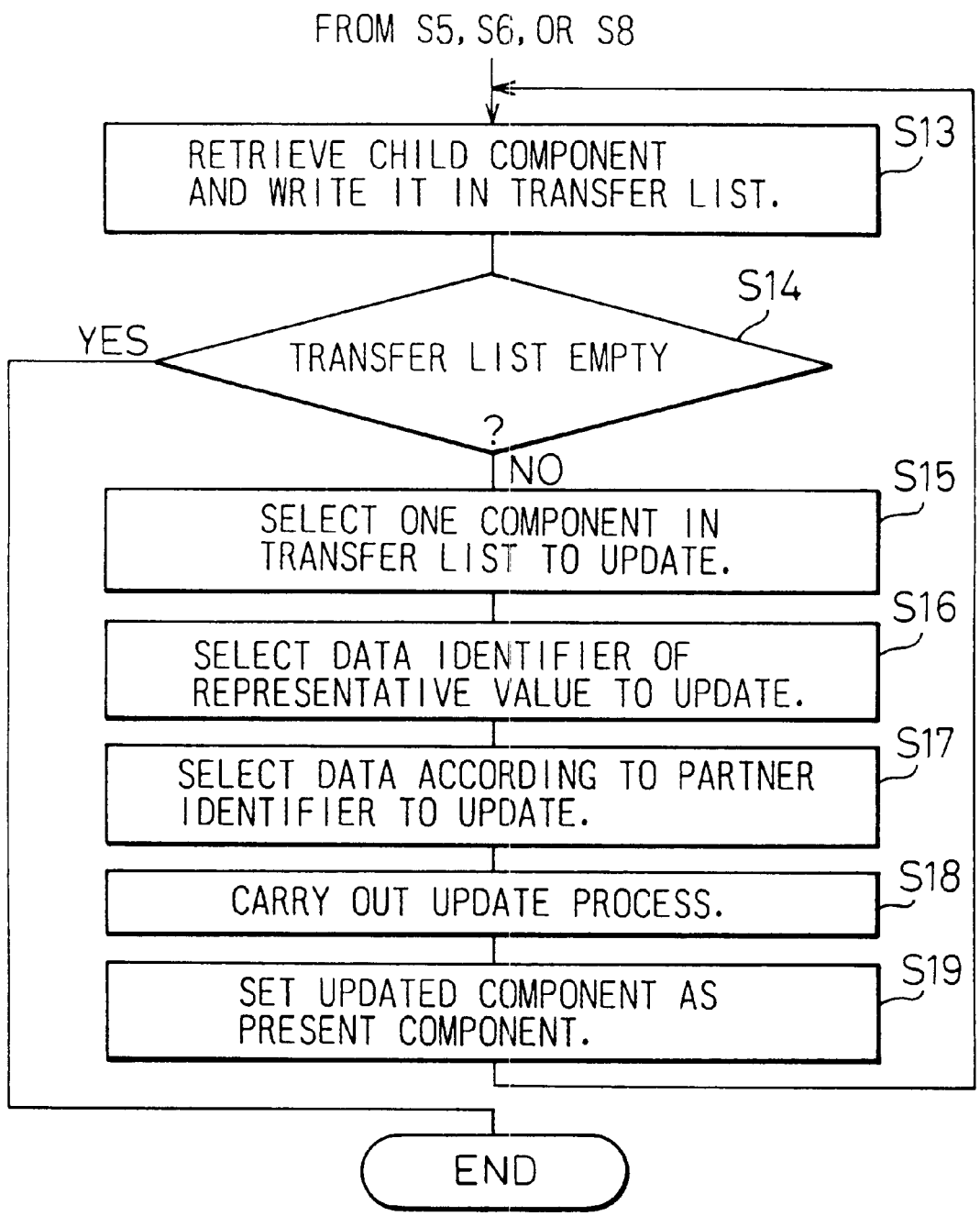
FIG. 5 is a flowchart showing the second half of the steps taken by the data link unit.

FIG. 4 is the first half of steps taken by the data link unit 8, and FIG. 5 is the second half thereof. Step S1 sets a specified graphic component as a component to update. Step S2 sets a specified data identifier as data to update. Step S3 sets a specified value as an update value. Step S4 carries out an update process. Step S5 determines whether or not the data identifier whose value has been updated corresponds to a representative value. If it corresponds to the representative value, step S6 is carried out, and if not, step S13 is carried out. The step S6 determines whether or not a partner identifier is "nil." If it is not "nil," step S7 is carried out, and if it is "nil," the step S13 is carried out. The step S7 retrieves a parent component according to data in the inclusive-relationship manager 10. Step S8 determines whether or not the data in the manager 10 include the parent component. If they include the parent component, step S9 is carried out, and if not, the step S13 is carried out. The step S9 sets the partner identifier as data to update. Step S10 sets the representative value of the parent component as a value to update. Step S11 sets the parent component as a component to update. Step S12 sets the parent component as a present component, and the flow returns to the step S4.

After the step S5, S6, or S8, the step S13 retrieves a child component in the inclusive-relationship manager 10 and writes the child component in a transfer list. Step S14 determines whether or not the transfer list is empty. If it is empty, the flow ends, and if not, the flow goes to step S15. The step S15 extracts a component out of the transfer list and sets the same as a component to update. Step S16 sets a data identifier corresponding to a representative value as data to update. Step S17 sets, as an update value, a data value specified by the partner identifier of the update component. Step S18 carries out an update process. Step S19 sets the component to update as a present component, and the flow returns to the step S13.

Figure 6:
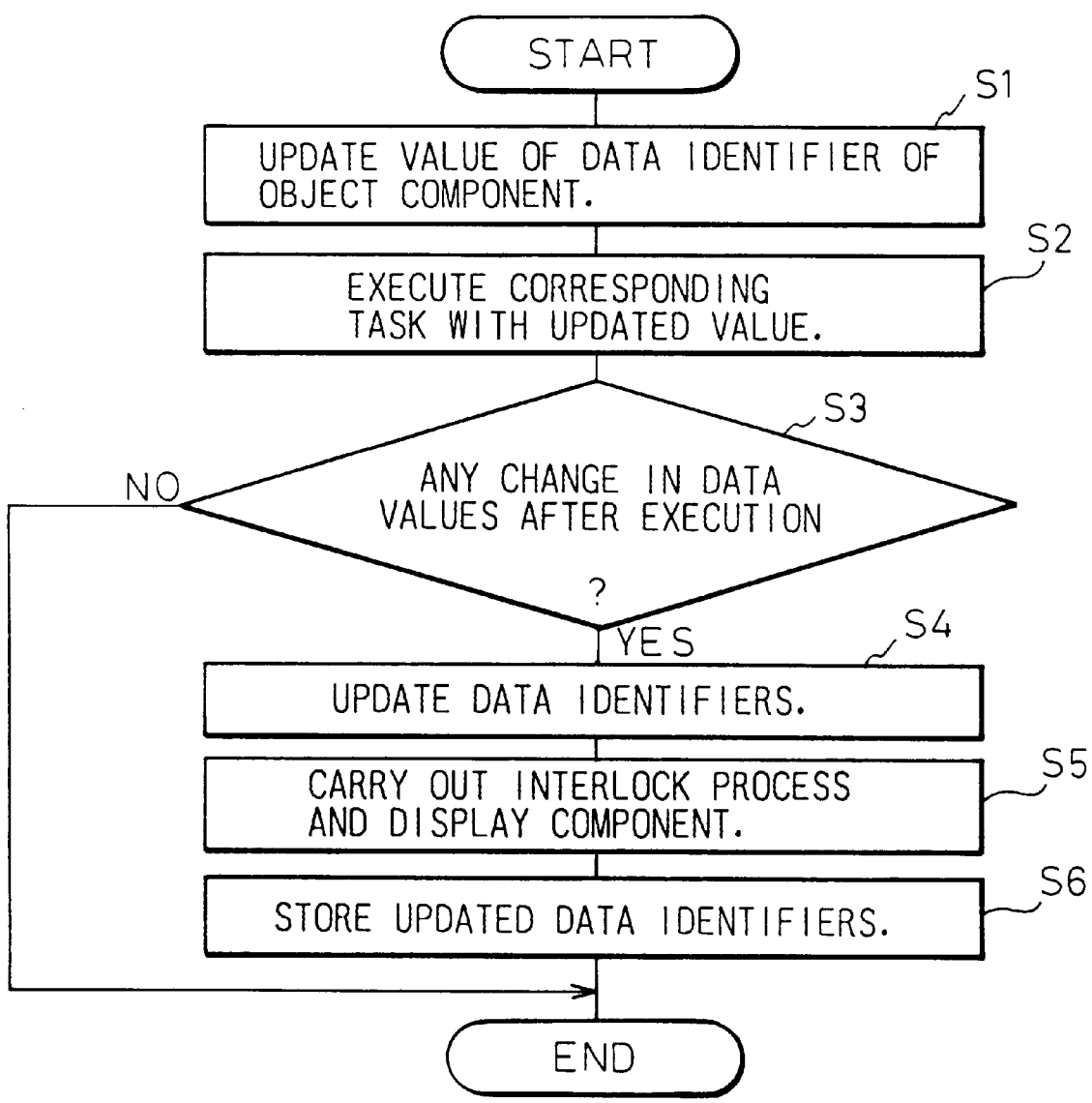
FIG. 6 is a flowchart showing steps taken by the data link unit when updating graphic components.

FIG. 6 is a flowchart showing the update process carried out by the data link unit 8. Step S1 updates values corresponding to data identifiers of a graphic component to be updated. Step S2 provides a task corresponding to the graphic component in question with the values of the data identifiers and carries out a string of instructions of the task. Step S3 determines whether or not the data values have been changed due to the execution of the instructions. If they have been changed, the flow goes to step S4, and if not, the flow ends. The step S4 updates the data values of the data identifiers. Step S5 carries out an interlock process to display the graphic component. Step S6 stores the changed values and data identifiers. The flow then ends.

Figure 7:
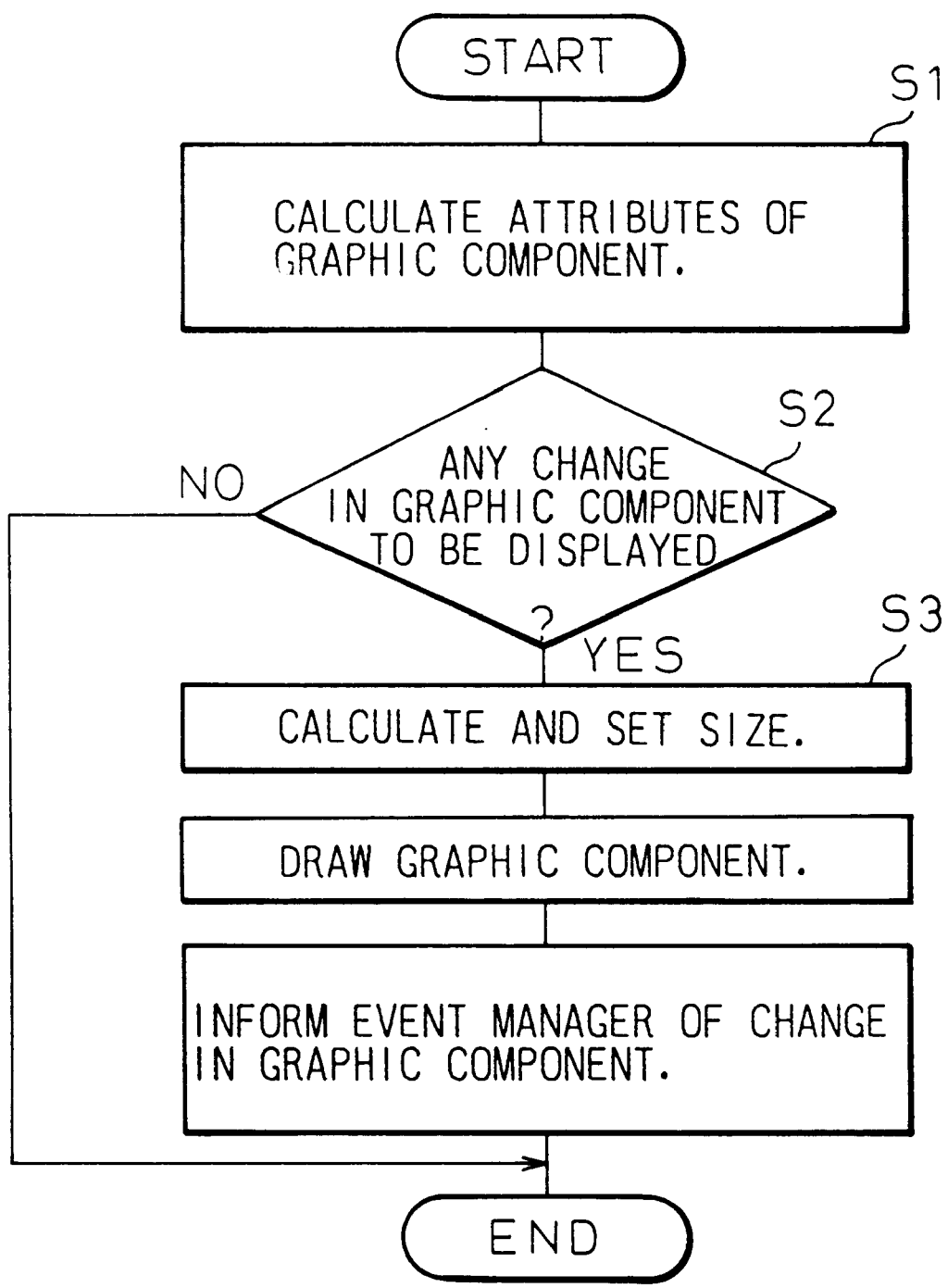
FIG. 7 is a flowchart showing the steps of interlocking and drawing graphic components.

FIG. 7 is a flowchart showing the interlock process for drawing a graphic component. If values in the data-structure data 3b have been changed, the data link unit 8 calls the event manager 9, to carry out the interlock process. Step S1 calculates the attributes such as the position, size, shape, and color of the graphic component in question according to data values in the data-structure data 3b. Step S2 determines whether or not there is a change in the graphic component to be displayed. If there is a change, step S3 is carried out, and if not, the flow ends. The step S3 calculates the size of an area for drawing the graphic component and sets the size in the graphic-component data 3a. Step S4 draws the graphic component on the display 11. Step S5 informs the event manager 9 of the change in the graphic component. Then, the flow ends. The interlock process corresponds to, for example, an edit program for moving the indicator of the meter B in FIG. 2.

Figure 8:
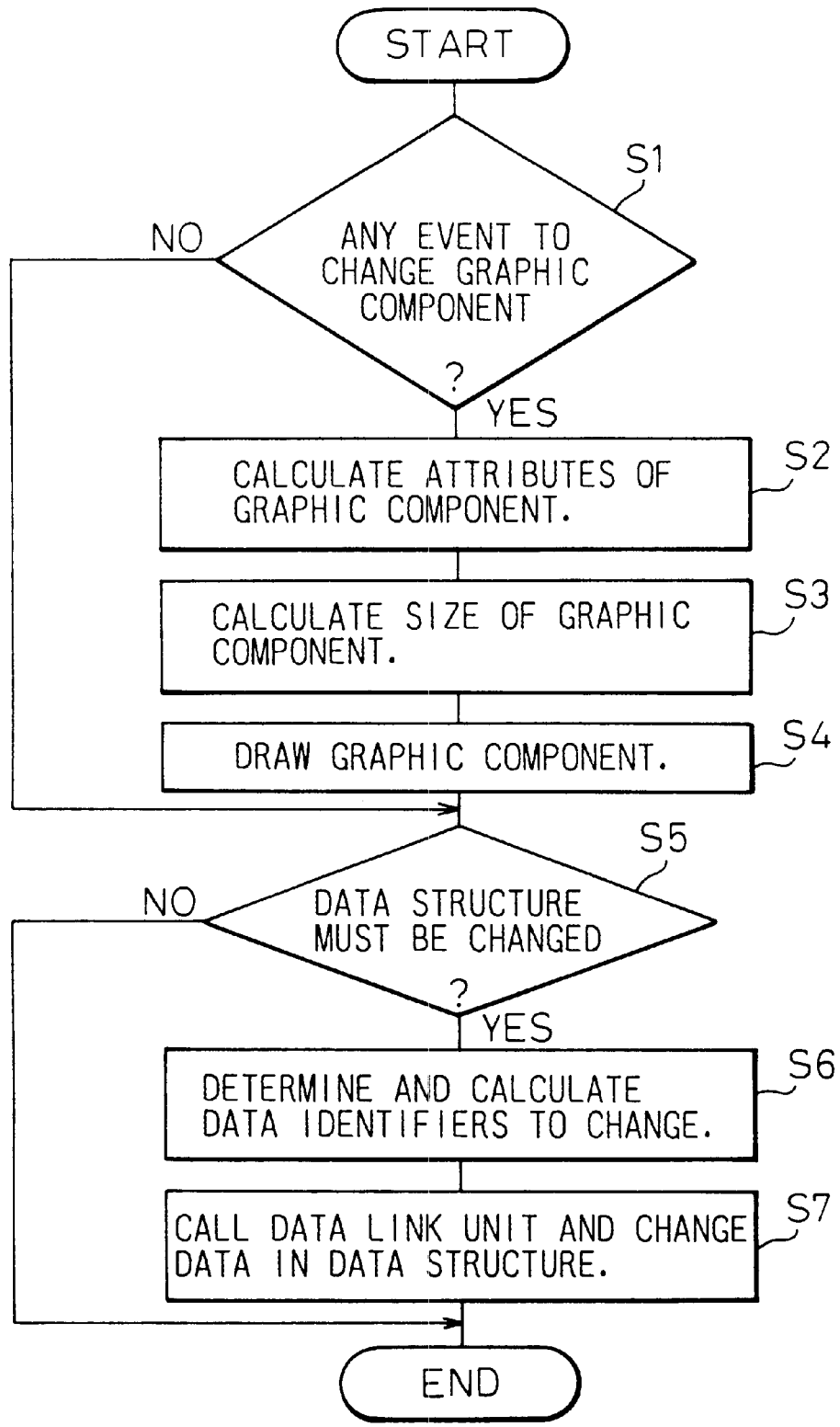
FIG. 8 is a flowchart showing the steps of interlocking graphic components when an event occurs.

FIG. 8 is a flowchart showing steps to deal with an event. When an event occurs to change any graphic component on the display 11, the event manager 9 calls an interlock process to rewrite data. Step S1 determines whether or not an event to change a graphic component has occurred. If it has occurred, step S2 is carried out, and if not, step S5 is carried out. The step S2 calculates the attributes such as the position, size, and shape of the graphic component in question. Step S3 calculates the size of an area for drawing the graphic component and sets the size in the graphic-component data 3a. Step S4 draws the graphic component on the display 11. The step S5 determines whether or not data values in the data-structure data 3b must be changed due to the event. If they must be changed, the flow goes to step S6, and if not, the flow ends. The step S6 determines data identifiers corresponding to the data values to be changed, and calculates new values. Step S7 calls the data link unit 8 to set the calculated values in the data-structure data 3b.

Figure 9:
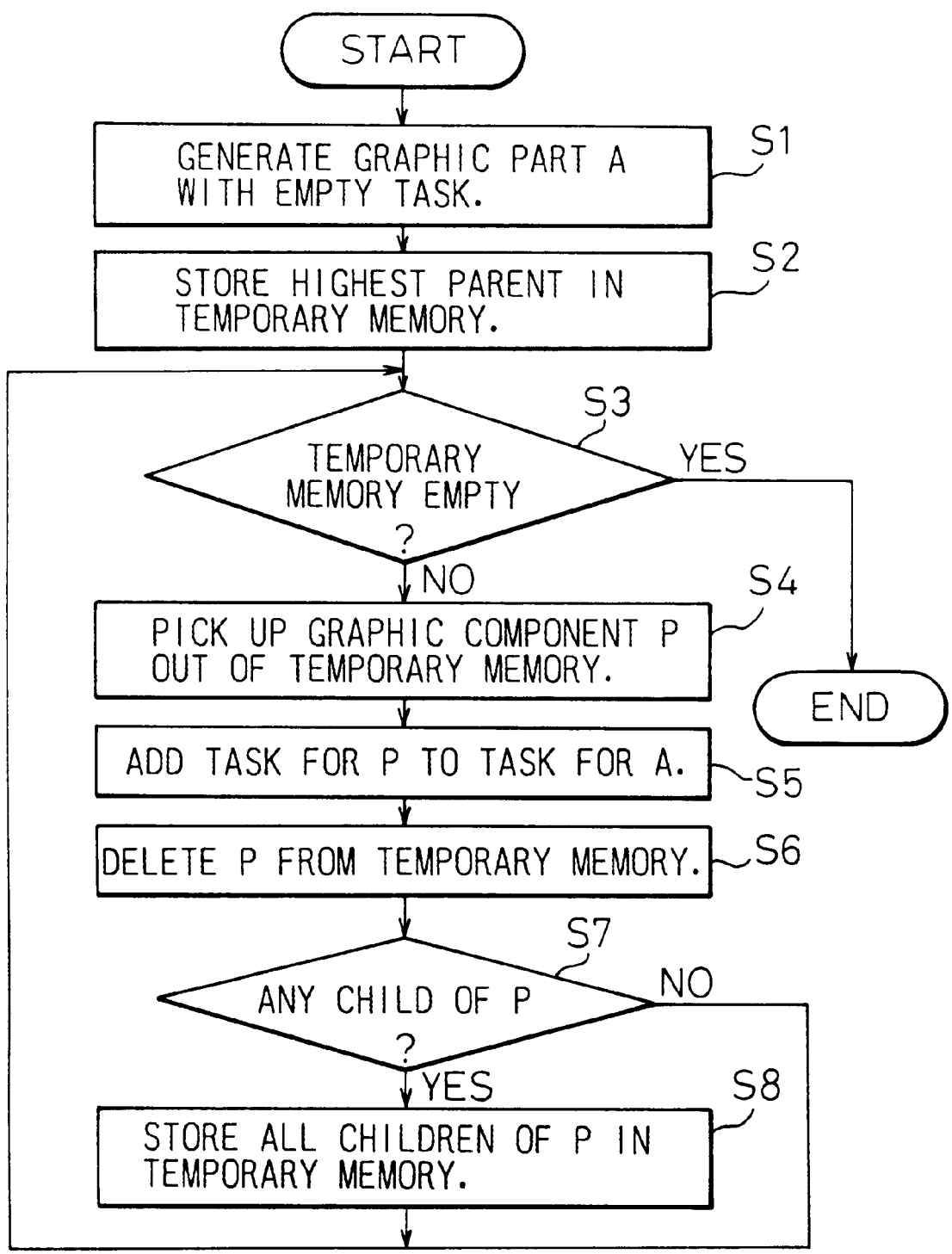
FIG. 9 is a flowchart showing the steps of generating a new process structure according to pasted graphic components.

FIG. 9 is a flowchart showing the steps of generating a new process structure by pasting original structures. Step S1 creates a graphic component A having an empty task. Step S2 registers a highest parent in a temporary memory. Step S3 determines whether or not the temporary memory is empty. If it is empty, the flow ends, and if not, step S4 picks out one graphic component P from the temporary memory. Step S5 adds a task corresponding to the component P to the task of the component A. Step S6 deletes the component P from the temporary memory. Step S7 determines whether or not the component P has a child. If it has a child, the flow goes to step S8, and if not, the flow returns to the step S3. The step S8 registers all children of the component P in the temporary memory.

Figure 10:
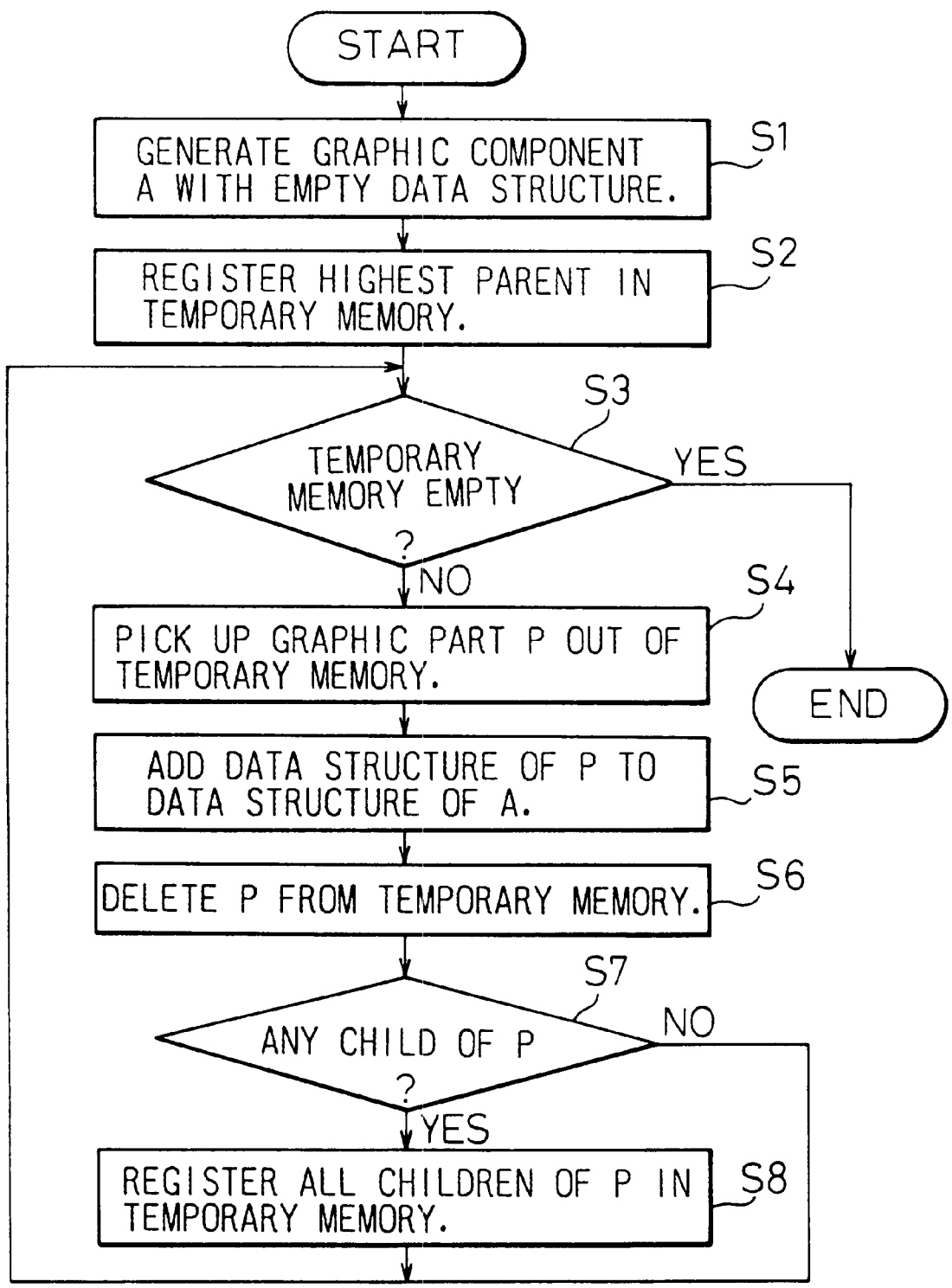
FIG. 10 is a flowchart showing the steps of generating a new data structure according to pasted graphic components.

FIG. 10 is a flowchart showing the steps of generating a new data structure by pasting original structures. Step S1 generates a graphic component A having an empty data structure. Step S2 registers a highest parent in the temporary memory. Step S3 determines whether or not the temporary memory is empty. If it is empty, the flow ends, and if not, step S4 picks out a component P from the temporary memory. Step S5 adds the data structure of the component P to the data structure of the component A. Step S6 deletes the component P from the temporary memory. Step S7 determines whether or not the component P has a child. If it has a child, the flow goes to step S8, and if not, the flow returns to the step S3. The step S8 registers all children of the component P in the temporary memory.

Figure 11:
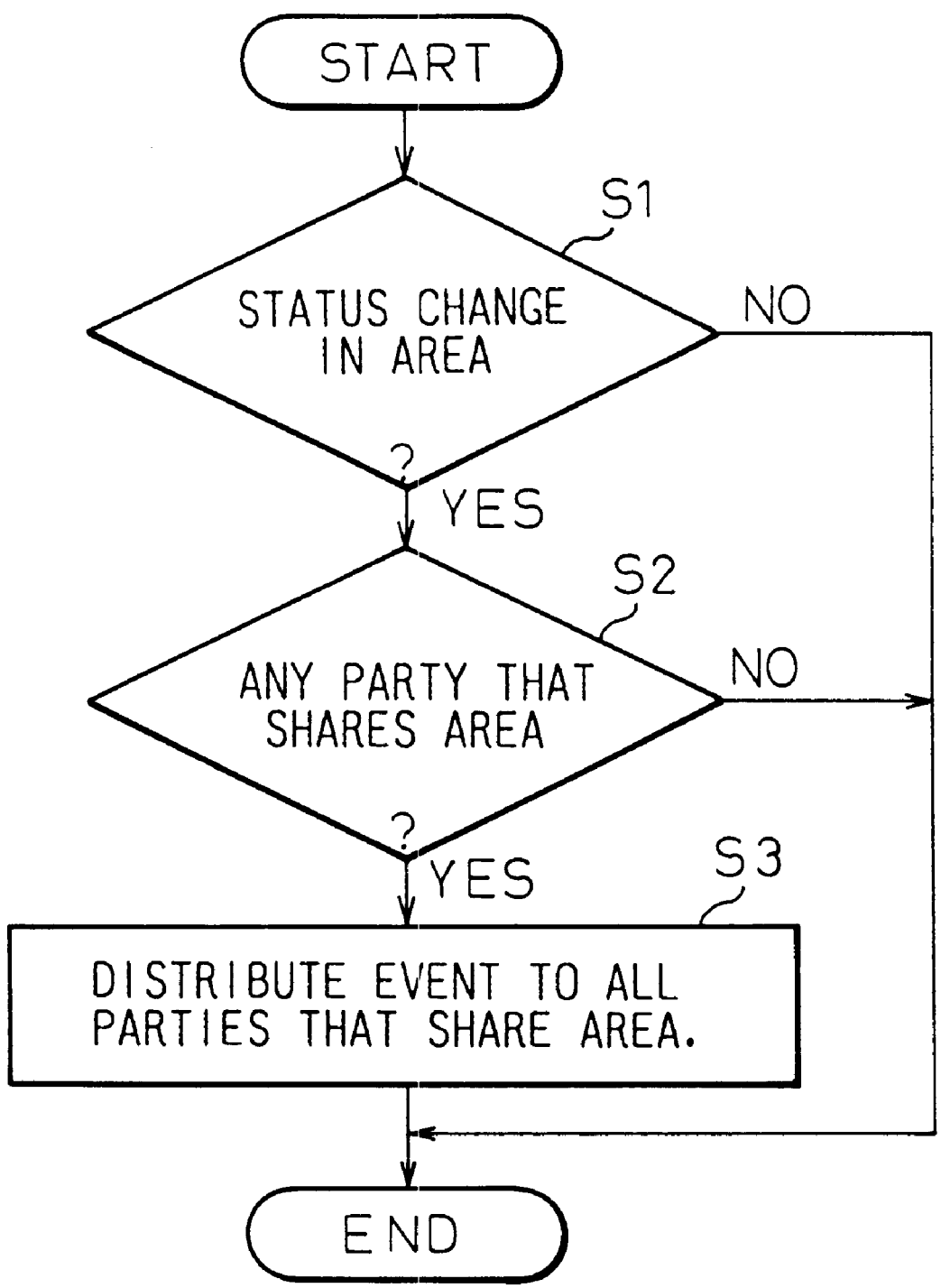
FIG. 11 is a flowchart showing the steps of distributing an event.

FIG. 11 is a flowchart showing the steps of distributing an event. Step S1 determines whether or not a status change, i.e., an event has occurred in a given area. If it has occurred, the flow goes to step S2, and if not, the flow ends. The step S2 determines whether or not there is any party that shares the area. If there is, step S3 distributes the event to all parties that share the area, and if not, the flow ends.

Figure 12:
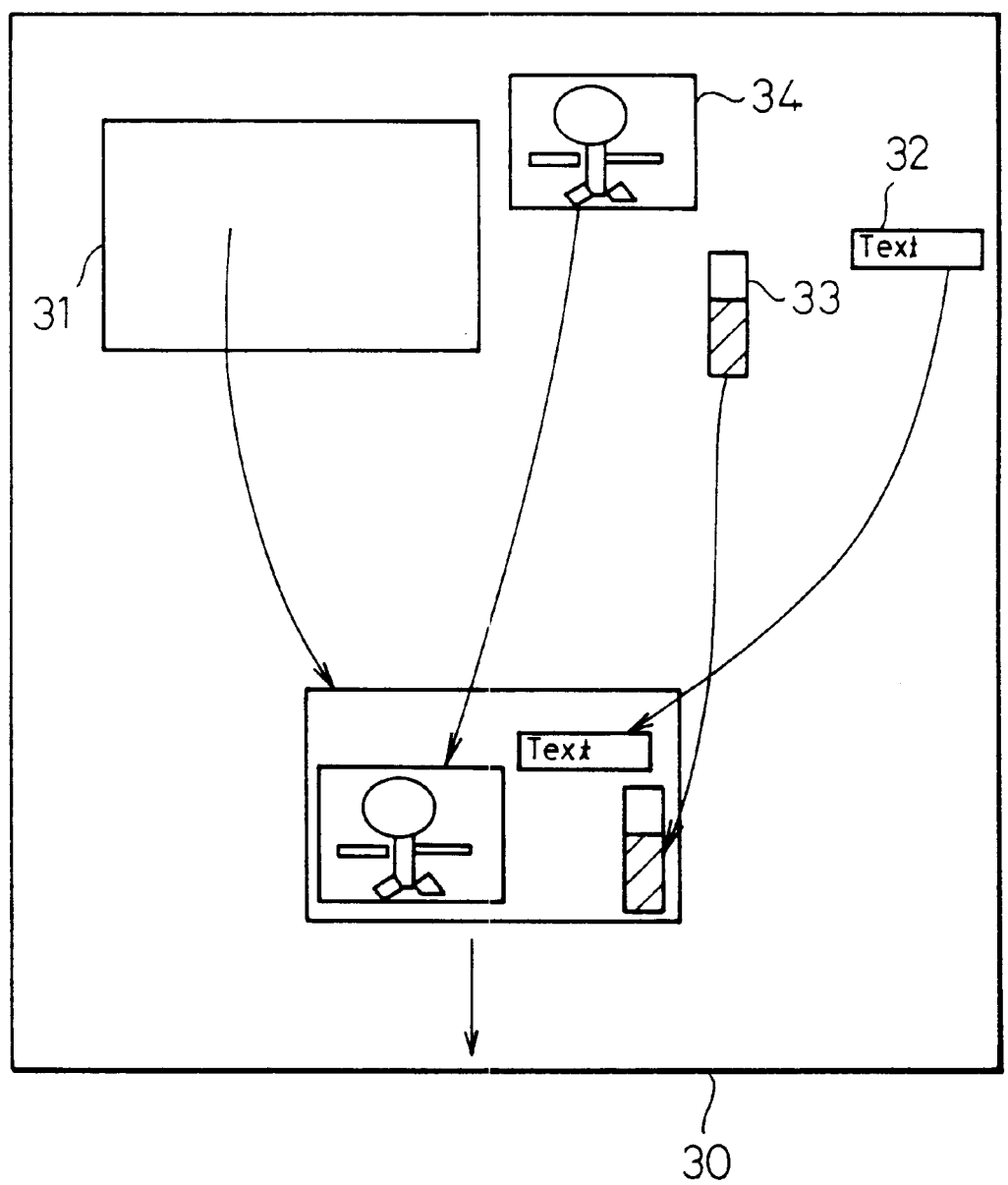
FIG. 12 shows a first embodiment of the present invention.

FIG. 12 shows the first embodiment of the present invention. An upper part of a display 30 shows a graphic component 31 having a four-arithmetic-rule function, a graphic component 32 having an input function, a graphic component 33 having a bar-graph function, and a graphic component 34 having an image-display function. These components are stored in the graphical programming system of the present invention in advance, and a menu of the components is displayed on the display 30. Any of the components can be selected in the menu with a mouse and be displayed on the display. A lower part of the display 30 shows the component 31 on which the components 32 to 34 are pasted. Numeric data written on the input component 32 are passed to the four-arithmetic-rule component 31. If the representative value of the component 31 is addition, the numeric data are subjected to addition, and the result is supplied to the bar-graph component 33 and image-display component 34. Consequently, the bar of the component 33 and the image of the component 34 change. For example, an image of a person in the component 34 runs or lies accordingly. The input component 32 and bar-graph component 33 are GUI components. Standardized GUI components can be intellectual assets enabling any user to create new components representing new programs only by manipulating the standardized components without complicated programming techniques. The new components will be kept as new intellectual property.

Figure 13A:
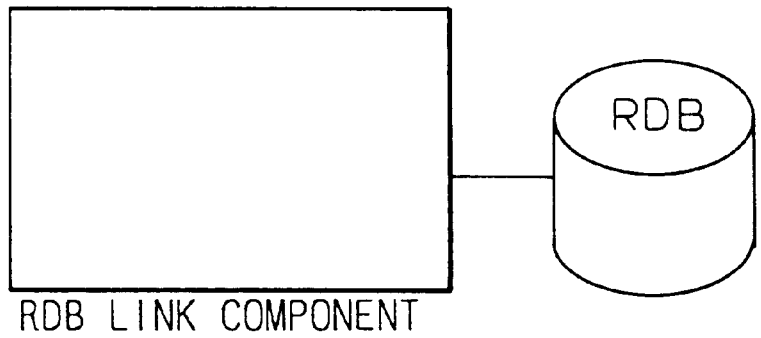
FIG. 13A shows an RDB (relational database) link component according to a second embodiment of the present invention.
Figure 13B:
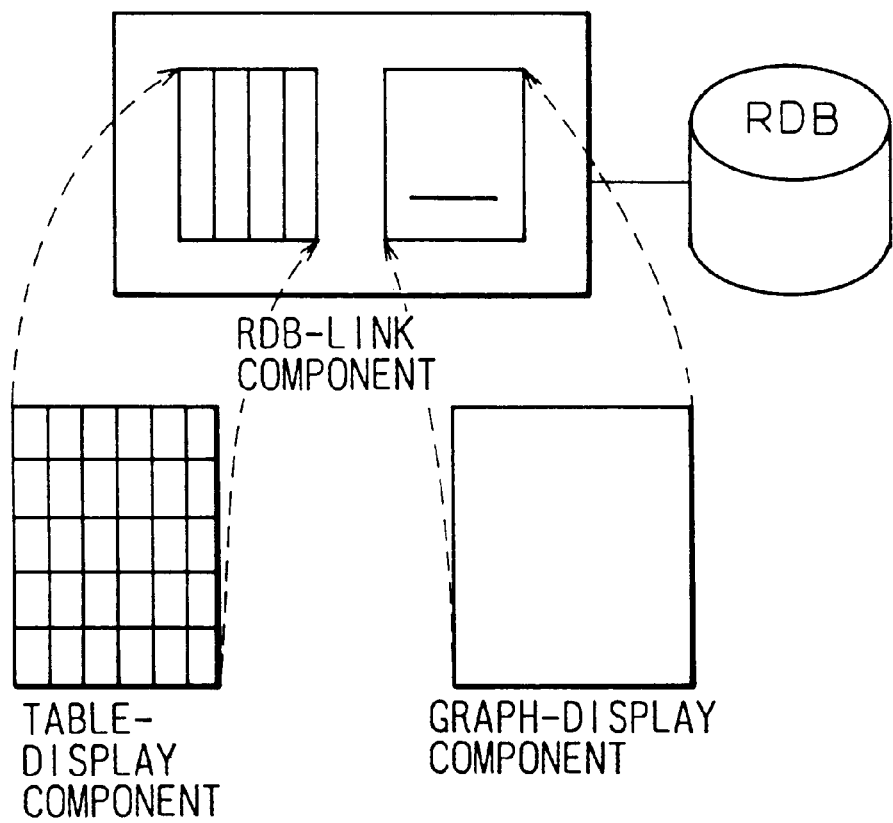
FIG. 13B shows a graph-display component and a table-display component to be pasted, according to the second embodiment.

FIGS. 13A and 13B show the second embodiment of the present invention, in which FIG. 13A shows an RDB (relational database) link component and FIG. 13B shows a graph-display component and a table-display component that are pasted on the RDB-link component. This embodiment reads data out of an RDB, writes data in the rows and columns of a table, and plots a graph. When the graph-display component and table-display component are pasted onto the RDB-link component, data are automatically read out of the RDB. The read data are written in the rows and columns of the table-display component, to draw the graphic-display component. When the graph-display and table-display components are pasted onto the RDB-link component, slots, i.e., ports of the RDB-link component to be connected to the graph-display and table-display components are determined. Some slots of the RDB-link component are connected to the RDB, to retrieve data necessary for the graph-display and table-display components out of the RDB.

Figure 14:
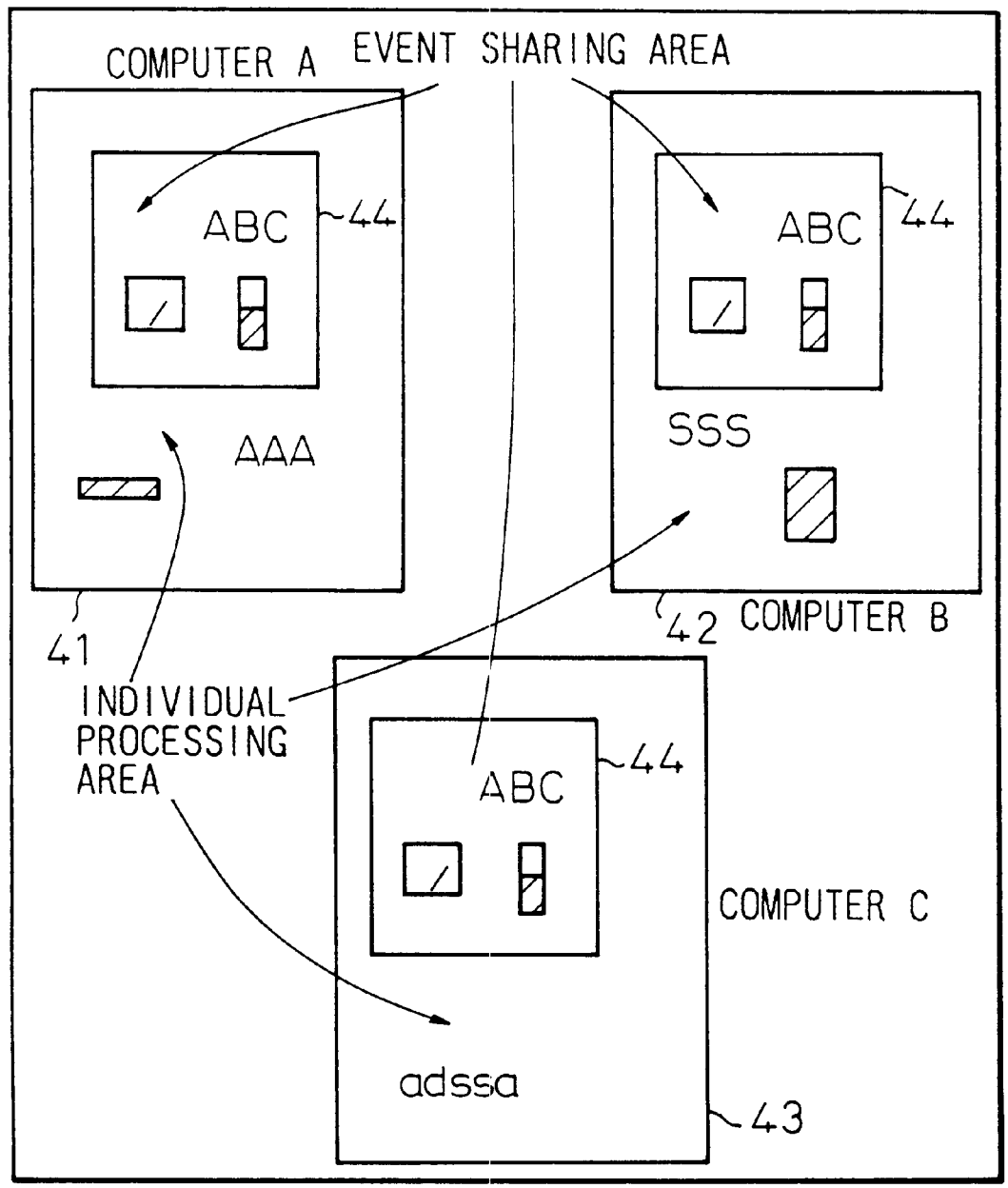
FIG. 14 shows a third embodiment of the present invention.

FIG. 14 shows the third embodiment of the present invention. Computers A, B, and C cooperate with one another and share events that occur in cooperation areas. The computers A, B, and C have displays 41, 42, and 43, respectively. Each of the displays has the cooperation area, i.e., a cooperation component 44. Any event that occurs in the cooperation component 44 is shared by the computers A, B, and C. The remaining area in each of the displays 41, 42, and 43 is used by the corresponding computer independently of the other computers. For example, the computer A is used by a teacher, and the computers B and C by students. Each of the students can separately use the remaining area excluding the area 44. If one of the students causes an event by operating a mouse or by changing images in the area 44, the same event occurs in the displays of the other student and teacher, so that the teacher can know the change caused by the student in the area 44.

Figure 15:
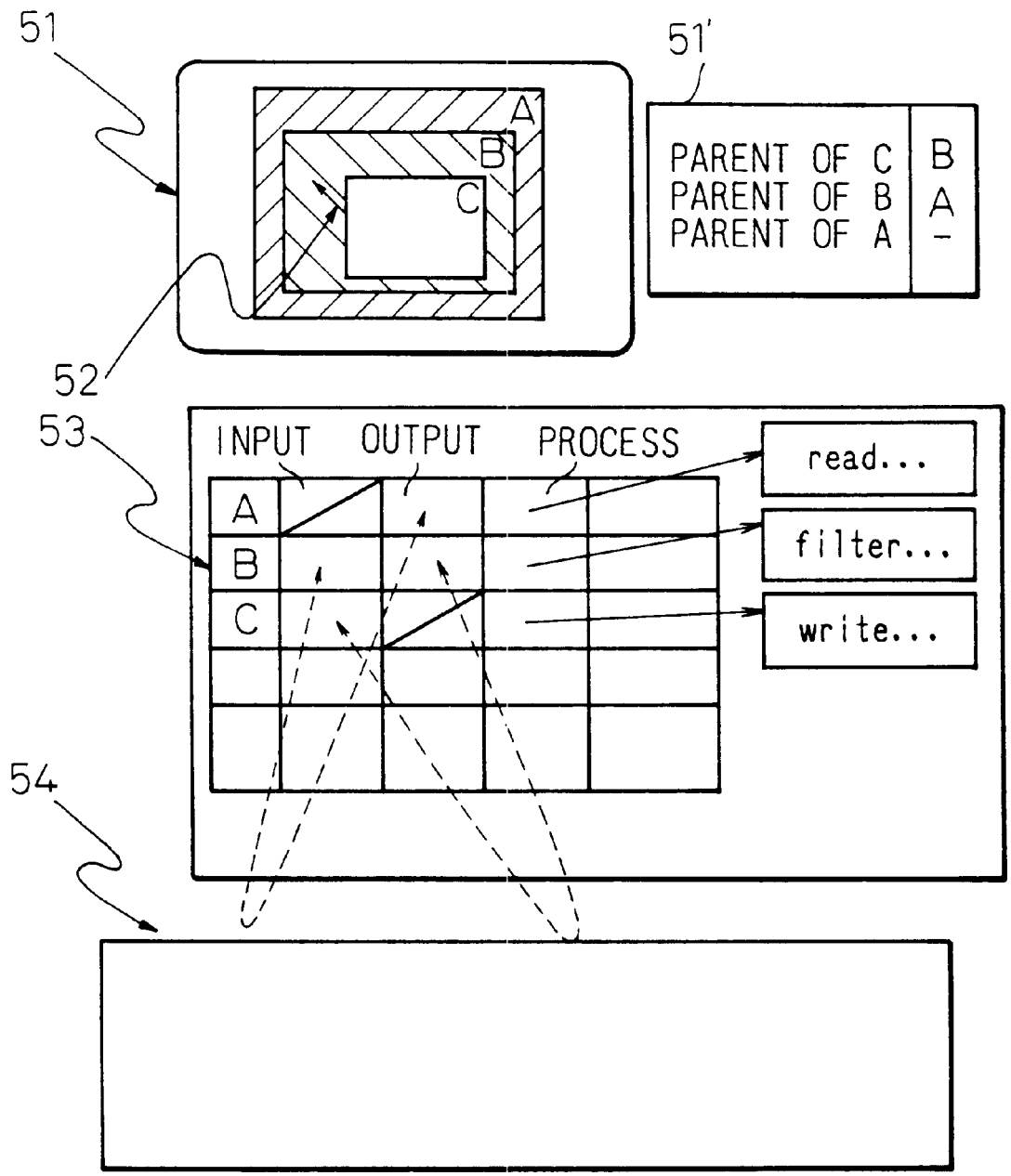
FIG. 15 shows a fourth embodiment of the present invention.

FIG. 15 shows the fourth embodiment of the present invention. A display 51 manages the positions, display conditions, and inclusive relationships of graphic components A, B, and C displayed thereon. An inclusive relationship specifier 52 inclusively relates the graphic components displayed on the display 51. A graphic-component memory 53 mainly stores functions related to the displayed graphic components. A structure converter 54 forms a new graphic component having a new structure by changing the data structures and/or process structures of the original graphic components. An inclusive-relationship manager 51' manages the inclusive relationships (parent-child relationships) of the displayed graphic components. Namely, the inclusive-relationship manager 51' manages the state that A is the parent of B, and B is the parent of C. The graphic-component memory 53 stores a table of the inclusive relationships of the components A, B, and C. The component A corresponds to an input process for receiving data from an input device, the component B corresponds to a filter process for processing the input data and providing output data, and the component C corresponds to an output process for providing an output device with the output data. The structure converter 54 arranges a parent component on the input side and a child component on the output side in each process. When the component B is put on the component A, and the component C on the component B with a mouse, the inclusive-relationship specifier 52 inclusively relates these components to one another, to define a series of processes including a process of filtering data from an input device and a process of transferring the filtered data to an output device.

Figure 16A:
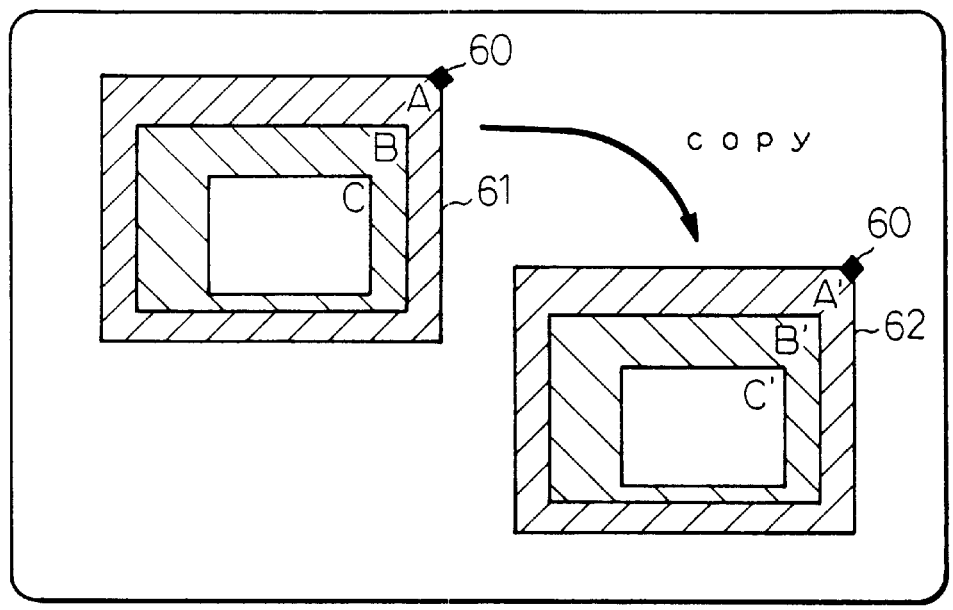
FIG. 16A shows an operation of copying graphic components according to the present invention.
Figure 16B:
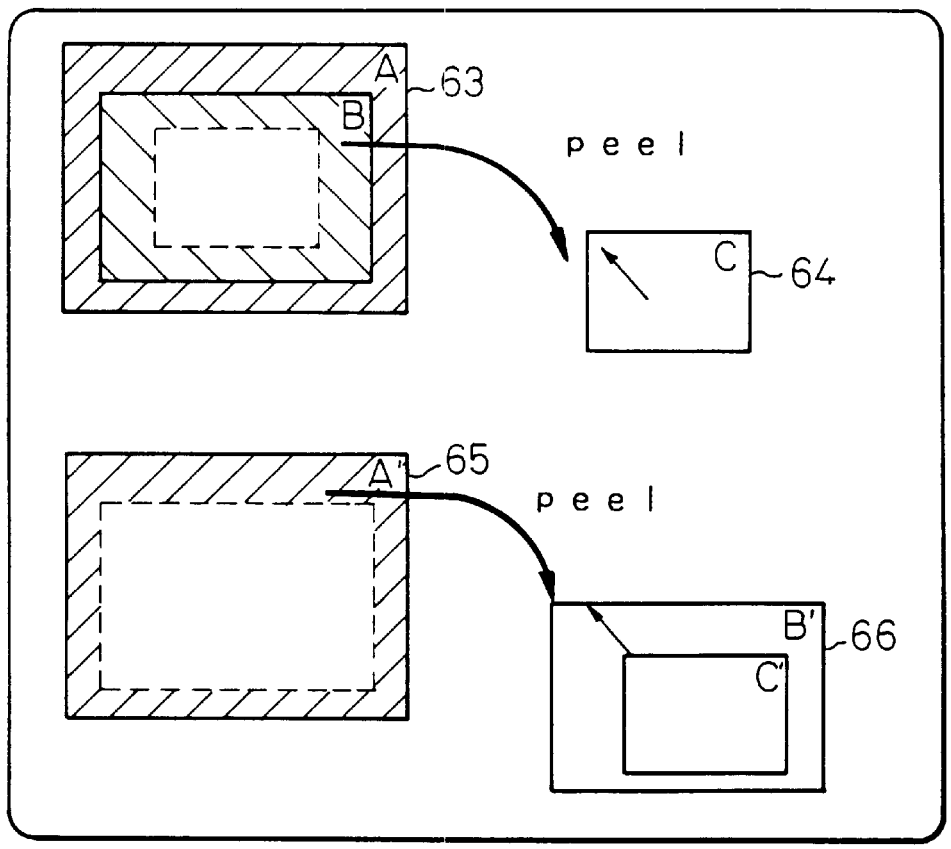
FIG. 16B shows an operation of peeling a graphic component according to the present invention.

FIGS. 16A and 16B show examples of handling graphic components according to the present invention, in which FIG. 16A shows copying graphic components and FIG. 16B shows peeling a graphic component. FIG. 16A shows graphic components A, B, and C in which A is the parent of B, and B is the parent of C. The components A, B, and C form a graphic component 61. When the right button of a mouse is clicked, a menu is displayed. In the menu, the left button of the mouse may be clicked on a menu item COPY. A handle 60 of the component 61 is pointed to and dragged by the mouse, and the left button of the mouse is clicked at a required position, to make a copy component 62 of the original component 61. The components 61 and 62 are usable independently of each other. The components A, B, and C are separately processed into components A', B', and C' after the copying. The upper part of FIG. 16B shows a graphic component 63 consisting of graphic components A, B, and C. The component C is dragged by a mouse to a required position. As a result, the component C is peeled off the component 63. Then, the component 63 only receives and processes an input. The lower part of FIG. 16B shows a graphic component 65 consisting of graphic components A', B', and C'. The component B' is dragged by the mouse to a required position. Namely, the components B' and C' are peeled off the component 65, to form a component 66, which processes data and provides an output.

Figure 17A:
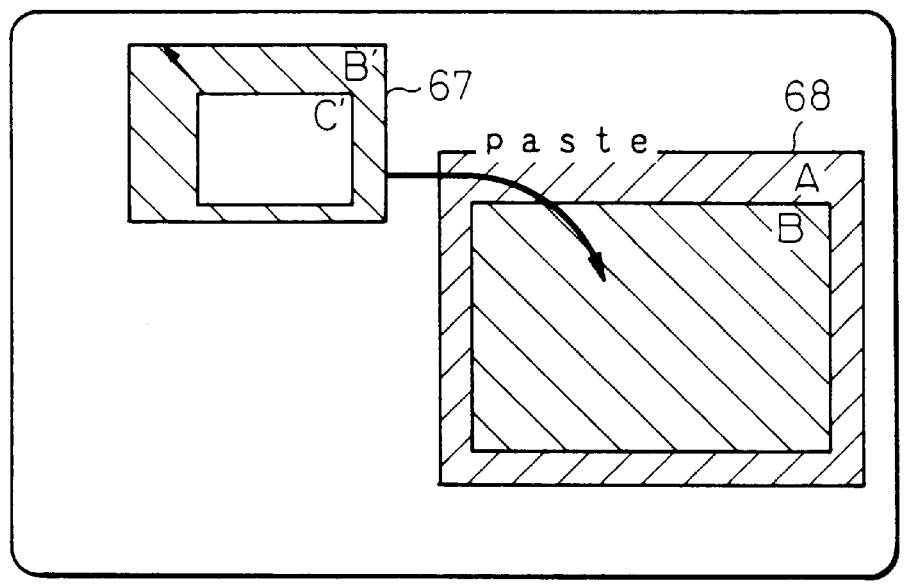
FIG. 17A shows graphic components to be pasted according to the present invention.
Figure 17B:
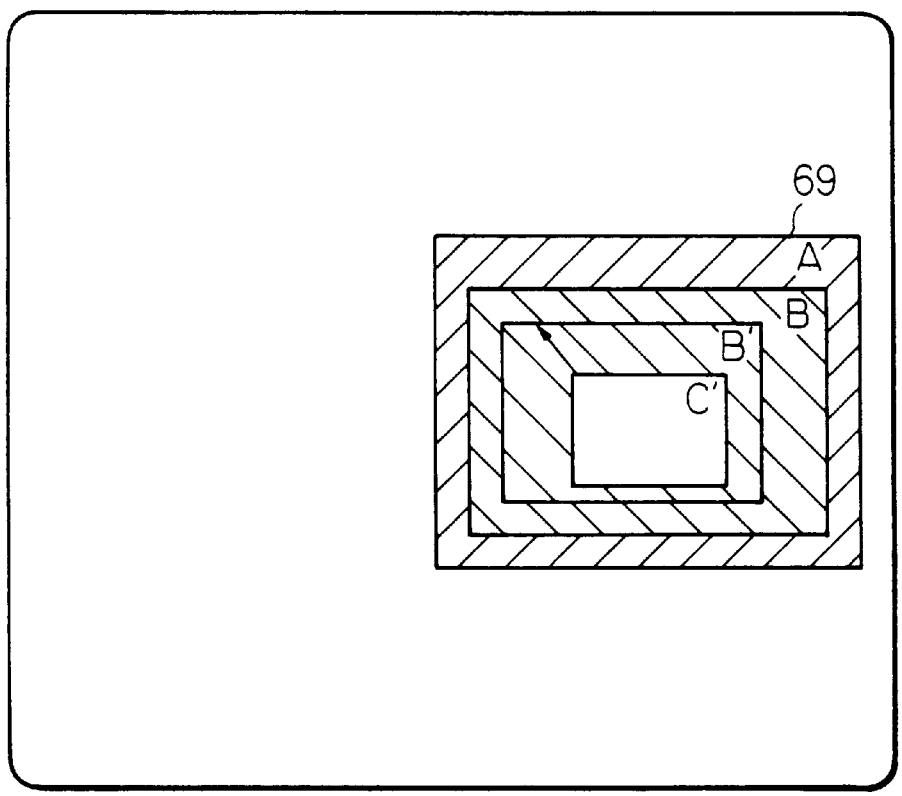
FIG. 17B shows the pasted graphic components according to the present invention.

FIGS. 17A and 17B show an example of pasting graphic components according to the present invention, in which FIG. 17A shows the graphic components before pasting and FIG. 17B shows the same after pasting. In FIG. 17A, a graphic component 67 consists of graphic components B' and C', and a graphic component 68 consists of graphic components A and B. In FIG. 17B, the graphic component 67 is pasted onto the graphic component 68, to form a new graphic component 69. In the component 69, input data to the component A are repeatedly processed by the components B and B', and a result is provided to the component C'.

Figure 18A:
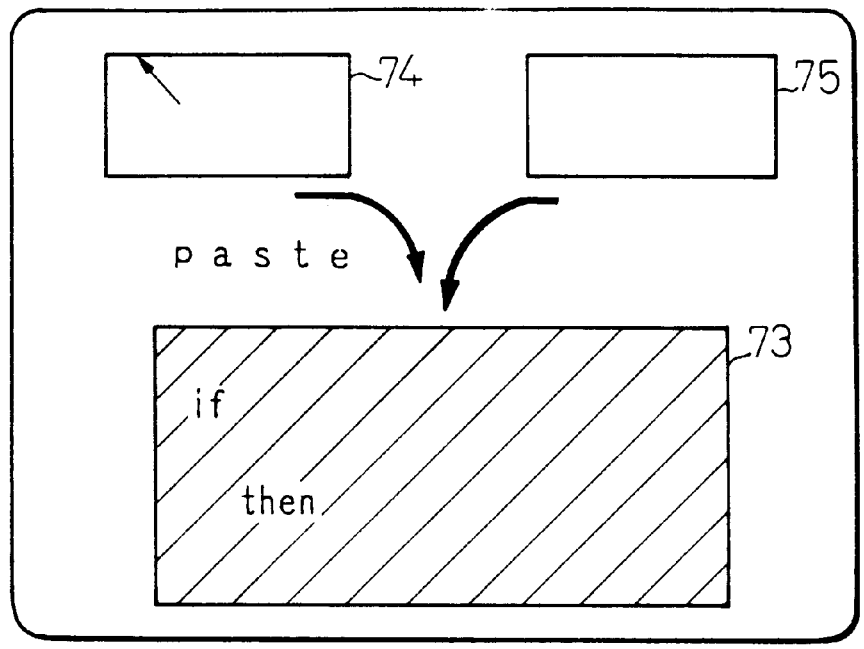
FIG. 18A shows graphic components to achieve a branching operation according to the present invention.
Figure 18B:
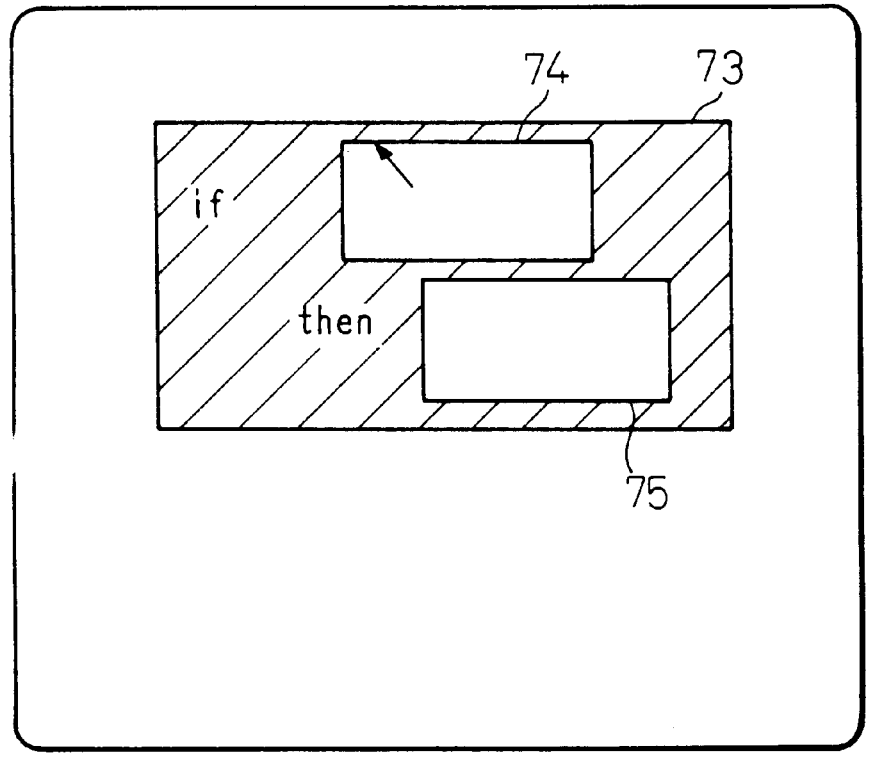
FIG. 18B shows the graphic components to achieve the branching operation.

FIGS. 18A and 18B show an example of forming a graphic component that executes a branching operation according to the present invention, in which FIG. 18A shows original graphic components and FIG. 18B shows a new graphic component prepared from the original ones. A branching-operation component 73 examines input data and determines a process to be executed. An input-process component 74 processes input data from an input device, and an output-process component 75 provides an output device with output data. The component 74 is dragged by a mouse onto the right side of "IF" on the component 73. The component 75 is dragged by the mouse to the right side of "THEN" on the component 73, thereby forming the branching-operation component 73 that executes a process depending on input conditions.

Figure 19A:
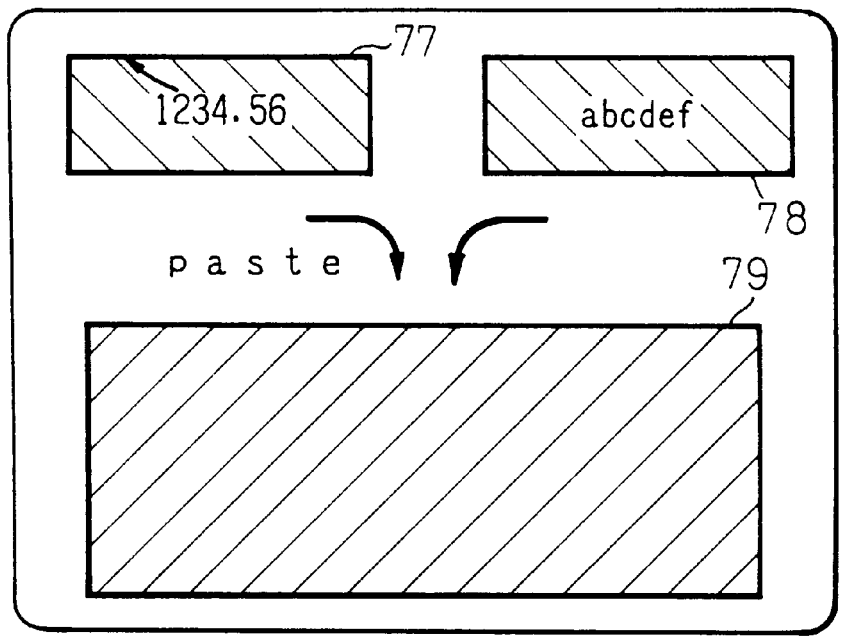
FIG. 19A shows two graphic components to be moved to create a new graphic component according to the present invention.
Figure 19B:
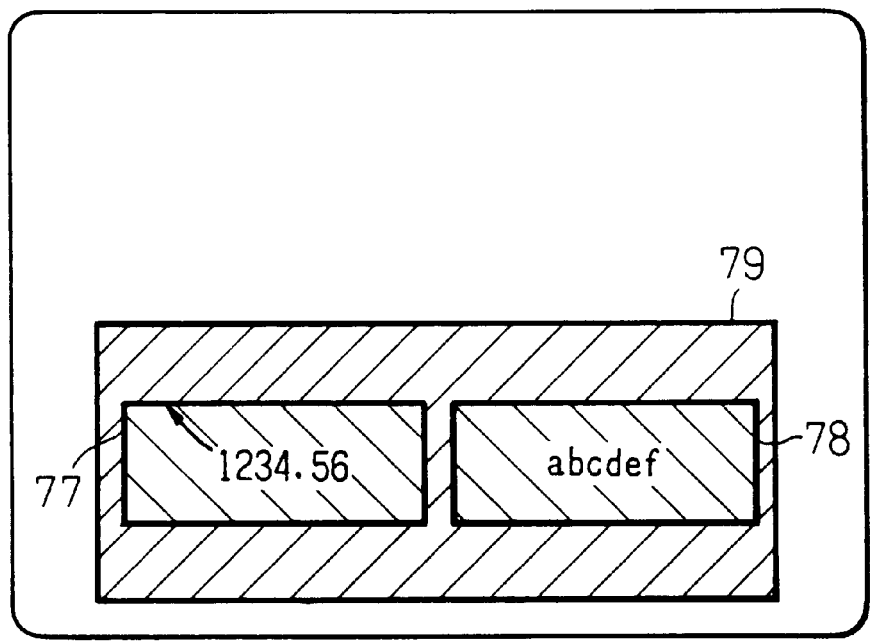
FIG. 19B shows the new graphic component created from the two graphic components.

FIGS. 19A and 19B show an example of moving two graphic components having different data structures, to form a graphic component having a different data structure, according to the present invention. FIG. 19A shows original graphic components and FIG. 19B shows a new graphic component prepared from the original ones. In FIG. 19A, a component 77 has numeric data, and a component 78 has character data. The components 77 and 78 are pasted onto an empty component 79. In FIG. 19B, the pasted components 77, 78, and 79 form a new component 79. The component 79 is a graphic component to form a data structure.

Figure 20:
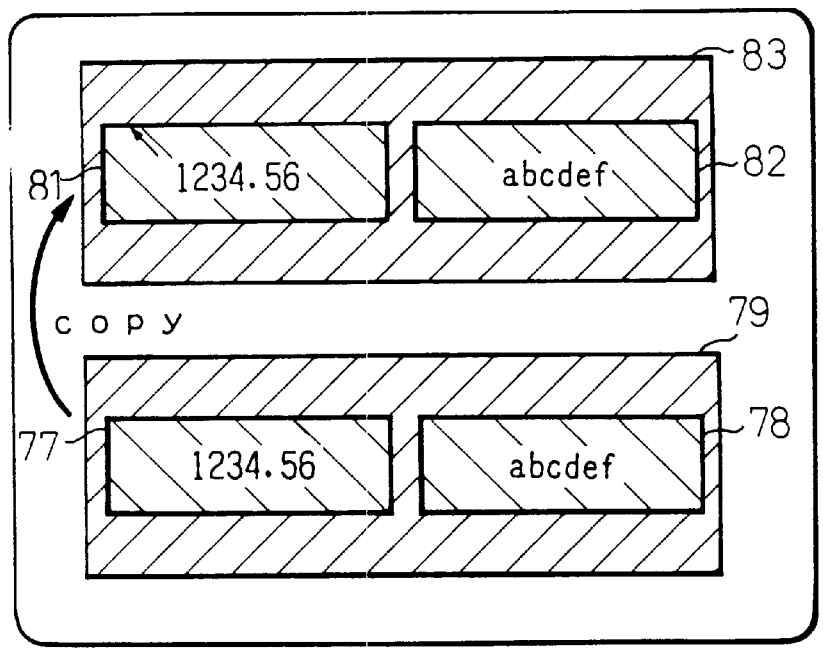
FIG. 20 shows an operation of copying a graphic component involving different data structures according to the present invention.

FIG. 20 shows an example of copying a graphic component having different data structures. A component 77 has numeric data, and a component 78 has character data. These components 77 and 78 are moved onto a dictionary component, to form a component 79. The component 79 is copied to form an identical component 83. The two identical components 79 and 83 are manipulated independently of each other. Components 81 and 82 that form the component 83 are handled independently of the component 79. The components 79 and 83 can be used as records of an RDB.

Figure 21:
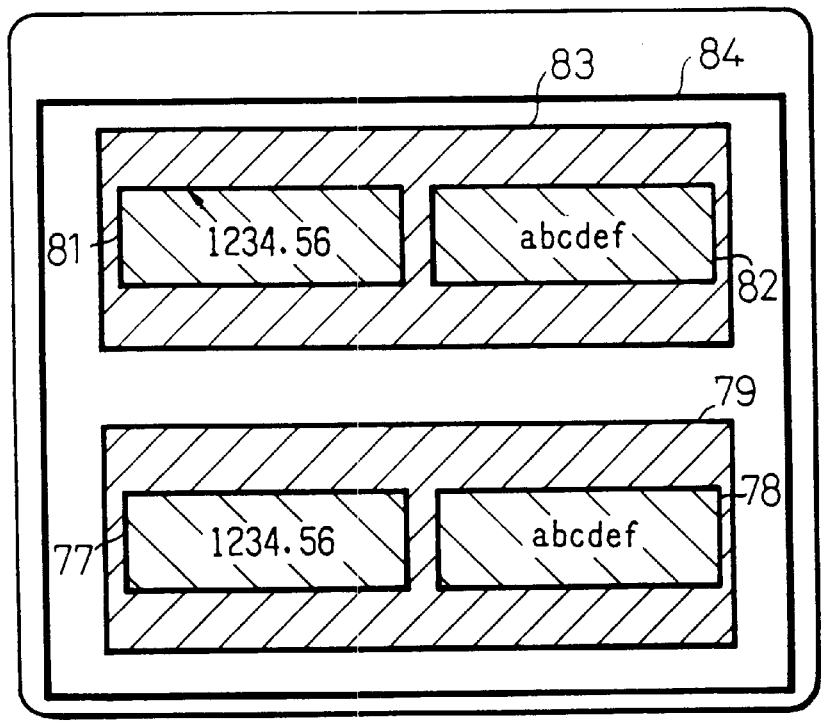
FIG. 21 shows two identical graphic components each involving different data structures, pasted on a dictionary graphic component, according to the present invention.

FIG. 21 shows two identical graphic components each having different data structures, pasted on a dictionary component. Components 79 and 83 are put on a dictionary component 84. The component 84 contains a mixture of a numeric-data component 77, a character-data component 78, a numeric-data component 81, and a character-data component 82. In this way, the present invention is capable of easily forming a component having a complicated data structure. The component 84 is applicable to copy an RDB table.

As explained above, the graphical programming system according to the present invention allows every user to create or edit an application program that is presently allowed only for programmers.

A new graphic component created from a combination of original graphic components according to the present invention is reusable for creating application programs. The functions of these components are visual, so that users may visually grasp the functions.

The present invention visually links data without programming languages. Accordingly, the linked data are easy to read.

The present invention allows users to easily handle a data structure and create a program having a complicated data structure without program errors. The data structure of the program thus created is easy to read, edit, and reuse.

The present invention simultaneously edits a graphic component and a corresponding process. Accordingly, a user can create a program by manipulating graphic components. A newly created graphic component also allows a user to visually understand the function thereof. Namely, the process corresponding to the created component is easy to read and reuse.

Although the present invention has been disclosed and described by way of embodiments, it is apparent to those skilled in the art that other embodiments and modifications of the present invention are possible without departing from the spirit or essential features thereof.

What is claimed is:

1. A graphical programming system, comprising:

means for relating a graphic component to a program, the function of the graphic component being displayed on a screen;

inclusive-relationship specifying means for inclusively relating a child graphic component to a parent graphic component so that the child graphic component transmits data to the parent graphic component or the parent graphic component transmits data to the child graphic component during execution;

data link means for transmitting data between the inclusively related graphic components; and means for generating a program for a new graphic component, defining a new task, including at least the inclusively-related child and parent graphic components, and displaying the inclusively-related child and parent graphic components as the new graphic component along with the execution result of the program.

2. A graphical programming system letting a user enter instructions through input means to manipulate graphic components displayed on a display, to create a new graphic component and a corresponding new program, comprising:

graphic-component storage means for storing data on graphic components, each corresponding to a program, executing a task such as one of an operation task and a database task, and displaying the graphic components on the display so that the function of the graphic components can be understood by users;

task storage means for storing the programs corresponding to the graphic components and providing the graphic-component storage means with results of execution of the programs;

graphic-component generation means automatically generating data visualizing the graphic components corresponding to the programs stored in the task storage means and storing the generated data in the graphic-component storage means:

inclusive-relationship specifying means for inclusively relating graphic components to one another on the display according to instructions entered through the input means and allowing the graphic components to transmit data to each other during execution, and displaying the inclusively-related new graphic component on the display;

inclusive-relationship management means for storing the inclusive relationships; and data link means for transmitting data among the graphic components according to the inclusive relationships stored in the inclusive-relationship management means.

3. The graphical programming system according to claim 2, further comprising:

representative-value changing means for selecting, as a representative value of a given graphic component, data that are included in a data structure of the given graphic component and used for data transmission with another graphic component; wherein the data structure is in the graphic-component storage means, to temporarily store data to be transmitted to another graphic component and store data from the task.

4. The graphical programming system according to claim 3, further comprising:

process structure conversion means for determining the process structure of a program corresponding to a new graphic component created by inclusively relating original graphic components.

5. The graphical programming system according to claim 2, further comprising:

process structure conversion means for determining the process structure of a program corresponding to a new graphic component created by inclusively relating original graphic components without use of an intermediate language.

6. The graphical programming system according to claim 5, further comprising:

data structure conversion means for determining the data structure of a given graphic component.

7. The graphical programming system according to claim 6, wherein the data link means has an interface transferring any kind of data among graphic components.

8. The graphical programming system according to claim 7, which communicates with other graphical programming systems, further comprising:

event manager means for forming a shared area on the display so that an event occurring in the shared area due to an operation through the input means or due to a change in a displayed image is shared between the graphical programming systems.

9. The graphical programming system according to claim 6, which communicates with other graphical programming systems, further comprising:

event manager means for forming a shared area on the display so that an event occurring in the shared area due to an operation through the input means or due to a change in a displayed image is shared between the graphical programming systems.

10. A graphical programming system, comprising:

a first unit for relating a graphic component to a program, the function of the graphic component being displayed on a screen;

an inclusive-relationship specifying unit inclusively relating a child graphic component to a parent graphic component so that the child graphic component transmits data to the parent graphic component or the parent graphic component transmits data to the child graphic component during execution;

a data link unit transmitting data between the inclusively related graphic components; and a second unit generating a program for a new graphic component, defining a new task, including at least the inclusively-related child and parent graphic components, and displaying the inclusively-related child and parent graphic components as the new graphic component along with the execution result of the program.

11. A graphical programming system letting a user enter instructions through an input unit to manipulate graphic components displayed on a display, to create a new graphic component and a corresponding new program, comprising:

a graphic-component storage unit storing data on graphic components, each corresponding to a program, executing a task such as one of an operation task and a database task, and displaying the graphic components on the display so that the function of the graphic components can be understood by users;

a task storage unit for storing the programs corresponding to the graphic components and providing the graphic-component storage unit with results of execution of the programs;

a graphic-component generation unit automatically generating data visualizing the graphic components corresponding to the programs stored in the task storage unit and storing the generated data in the graphic-component storage unit;

an inclusive-relationship specifying unit inclusively relating graphic components to one another on the display according to instructions entered through the input unit and allowing the graphic components to transmit data to each other during execution, and displaying the inclusively-related new graphic component on the display;

an inclusive-relationship management unit storing the inclusive relationships; and a data link unit transmitting data among the graphic components according to the inclusive relationships stored in the inclusive-relationship management unit.

* * * * *

UNITED STATES PATENT AND TRADEMARK OFFICE
CERTIFICATE OF CORRECTION

PATENT NO. : 6,154,875
DATED : November 28, 2000
INVENTOR(S) : Yuzuru Tanaka et al.

It is certified that error appears in the above-identified patent and that said Letters Patent is hereby corrected as shown below:

Title page,
[56] References Cited, Right Column under the heading OTHER PUBLICATIONS, insert:

Computer Science, Vol. 2, No. 1, 1992, pages 6-16.

Column 12,
Line 54, after "task" insert -- storage means --.

Signed and Sealed this

Eleventh Day of September, 2001

Attest:

Nicholas P. Godici

Attesting Officer

NICHOLAS P. GODICI
Acting Director of the United States Patent and Trademark Office